United States Patent
Noda et al.

(10) Patent No.: US 10,174,860 B2
(45) Date of Patent: Jan. 8, 2019

(54) ELECTROMAGNETIC VALVE AND TRANSMISSION-USE FUEL PRESSURE CONTROL DEVICE USING ELECTROMAGNETIC VALVE

(71) Applicants: AISIN AW CO., LTD., Anjo-shi, Aichi-ken (JP); NACHI FUJIKOSHI CORP., Tokyo (JP)

(72) Inventors: Yukihiro Noda, Ichinomiya (JP); Shuichi Takeda, Anjo (JP); Katsutoshi Komatsu, Nishio (JP); Hiroyuki Kutsubo, Nagoya (JP); Masamichi Yamaguchi, Anjo (JP); Masayuki Hara, Kurobe (JP); Syunji Miyanishi, Toyama (JP); Kazuhiro Yoshii, Nanto (JP); Makoto Miyatake, Toyama (JP)

(73) Assignees: AISIN AW CO., LTD., Anjo-shi, Aichi-ken (JP); NACHI FUJIKOSHI CORP., Minato-ku, Tokyo (JP)

(*) Notice: Subject to any disclaimer, the term of this patent is extended or adjusted under 35 U.S.C. 154(b) by 0 days.

(21) Appl. No.: 15/553,209

(22) PCT Filed: Mar. 4, 2016

(86) PCT No.: PCT/JP2016/056717
§ 371 (c)(1),
(2) Date: Aug. 24, 2017

(87) PCT Pub. No.: WO2016/158200
PCT Pub. Date: Oct. 6, 2016

(65) Prior Publication Data
US 2018/0058604 A1 Mar. 1, 2018

(30) Foreign Application Priority Data
Mar. 30, 2015 (JP) ................. 2015-068475

(51) Int. Cl.
F16K 1/44 (2006.01)
F16K 31/06 (2006.01)
(Continued)

(52) U.S. Cl.
CPC ........ *F16K 31/0655* (2013.01); *B60K 17/046* (2013.01); *F16H 61/0006* (2013.01);
(Continued)

(58) Field of Classification Search
CPC ....................................... F16K 1/46
See application file for complete search history.

(56) References Cited

U.S. PATENT DOCUMENTS 5,603,483 A * 2/1997 Reuter .................... B60T 8/363
251/129.02
7,182,413 B2 * 2/2007 Starr ....................... B60T 8/363
251/129.02
(Continued)

FOREIGN PATENT DOCUMENTS

| JP | 5-141565 A | 6/1993 |
| JP | 2014-122664 A | 7/2014 |
| WO | 2013/138144 A1 | 9/2013 |

OTHER PUBLICATIONS

International Search Report for PCT/JP2016/056717 dated Jun. 7, 2016.

*Primary Examiner* — Derek D Knight
(74) *Attorney, Agent, or Firm* — Sughrue Mion, PLLC

(57) ABSTRACT

An electromagnetic valve for a transmission-use oil pressure control device including an oil pump that supplies oil pressure to a transmission, and an accumulator that accumulates an oil pressure generated by the oil pump. The electromagnetic valve includes: an electromagnetic valve main body connected to the accumulator and includes an oil path opening/closing valve element opening/closing an oil path between the accumulator and the transmission; a seal
(Continued)

member disposed in the electromagnetic valve main body sealing against oil leakage from a sliding portion of the oil path opening/closing valve element in the opening/closing operation of the oil path opening/closing valve element; and a pressure regulation mechanism disposed in the electromagnetic valve main body regulating to release an internal pressure in the accumulator when an accumulator-side oil pressure in the electromagnetic valve main body rises to a predetermined pressure or more.

18 Claims, 14 Drawing Sheets

(51) Int. Cl.
*B60K 17/04* (2006.01)
*F16H 61/00* (2006.01)
*F16K 1/46* (2006.01)
*F16H 61/36* (2006.01)
*F16K 1/00* (2006.01)
*F16H 61/02* (2006.01)

(52) U.S. Cl.
CPC ............... *F16H 61/36* (2013.01); *F16K 1/46* (2013.01); *F16K 31/0658* (2013.01); *F16K 31/0686* (2013.01); *F16H 61/0267* (2013.01); *F16H 2061/0034* (2013.01); *F16H 2061/0253* (2013.01); *F16K 1/00* (2013.01)

(56) References Cited

U.S. PATENT DOCUMENTS

| | | | |
|---|---|---|---|
| 7,717,399 B2 * | 5/2010 | Park | B60T 8/367 251/129.15 |
| 2015/0041693 A1 | 2/2015 | Jones et al. | |

* cited by examiner

ELECTROMAGNETIC VALVE AND TRANSMISSION-USE FUEL PRESSURE CONTROL DEVICE USING ELECTROMAGNETIC VALVE

CROSS REFERENCE TO RELATED APPLICATIONS

This application is a National Stage of International Application No. PCT/JP2016/056717 filed Mar. 4, 2016, claiming priority based on Japanese Patent Application No. 2015-068475 filed Mar. 30, 2015, the contents of all of which are incorporated herein by reference in their entirety.

TECHNICAL FIELD

The present disclosure relates to an electromagnetic valve and a transmission-use oil pressure control device using the electromagnetic valve.

BACKGROUND ART

An electromagnetic valve which has been conventionally known actuates a valve element to open and close a flow path. Such an electromagnetic valve is disclosed in, for example, WO 2013/138144 A1.

WO 2013/138144 A1 discloses an electromagnetic valve that opens a flow path by energizing an electromagnetic coil and actuating a movable core (valve element) in a cylinder. In this electromagnetic valve, the movable core (valve element) having, on its outer peripheral face, an O-ring (seal member) for reducing leakage of a fluid (hydraulic fluid) is held slidably with respect to an inner peripheral face of the cylinder. The movable core also has a biasing member for applying a pressing force to the O-ring, the biasing member being adjacent to the O-ring. In a state in which the movable core closes the flow path, a fluid (hydraulic fluid) accumulated by an accumulator on a high-pressure side (primary side) presses the O-ring with the biasing member through a clearance between the outer peripheral face of the movable core and the inner peripheral face of the cylinder to change the sectional shape of the O-ring. This configuration enhances the contact force (sealability) of the O-ring to the inner peripheral face of the cylinder to further reduce leakage of the high-pressure fluid (hydraulic fluid) toward a low-pressure side (secondary side) through the clearance between the movable core and the cylinder. As disclosed in WO 2013/138144 A1, the accumulator-use electromagnetic valve is provided with the O-ring for reducing leakage of a high-pressure fluid. In general, however, conventional oil path switch valves (solenoid valves) and proportional control electromagnetic valves (linear solenoid valves) are not provided with such an O-ring except for accumulator-use electromagnetic valves.

CITATION LIST

Patent Literature

Patent Literature 1: WO 2013/138144 A1

SUMMARY TECHNICAL PROBLEM

According to the accumulator-use electromagnetic valve disclosed in WO 2013/138144 A1, when a fluid pressure on the high-pressure side (primary side) is excessively acted on the O-ring (seal member) with the biasing member in association with an increase in volume due to a rise in temperature of the fluid (hydraulic fluid), the sealability to the inner peripheral face of the cylinder is enhanced along with the deformation of the O-ring. However, since the O-ring is crushed excessively, a frictional force to the inner peripheral face of the cylinder also increases. In this case, the movable core (valve element) is not actuated normally in some instances owing to an increase in sliding resistance on the O-ring (seal member) even when the electromagnetic coil is energized.

This subject matter has been devised in view of the circumstances described above, and an object is to provide an electromagnetic valve capable of normally actuating a valve element of an accumulator-use electromagnetic valve while maintaining the sealability of a seal member, and a transmission-use oil pressure control device using the electromagnetic valve.

SOLUTIONS TO PROBLEM

In order to attain the object described above, a first embodiment provides an electromagnetic valve for use in a transmission-use oil pressure control device including an oil pump that supplies an oil pressure to a transmission to be operated by the oil pressure, and an accumulator that accumulates an oil pressure generated by the oil pump. The electromagnetic valve includes: an electromagnetic valve main body that is connected to the accumulator and includes an oil path opening and closing valve element opening and closing an oil path between the accumulator and the transmission; a seal member that is disposed in the electromagnetic valve main body and seals against oil leakage from a sliding portion of the oil path opening and closing valve element in the opening and closing operation of the oil path opening and closing valve element; and a pressure regulation mechanism that is disposed in the electromagnetic valve main body and regulates to release an internal pressure in the accumulator when an accumulator-side oil pressure in the electromagnetic valve main body rises to a predetermined pressure or more.

In the electromagnetic valve according to the first embodiment, as described above, the electromagnetic valve main body includes the pressure regulation mechanism that regulates to release the internal pressure in the accumulator when the accumulator-side oil pressure in the electromagnetic valve main body rises to the predetermined pressure or more. Therefore, when the accumulator accumulates an oil pressure being the predetermined pressure or more, the pressure regulation mechanism can prevent the excessive oil pressure (internal pressure) from being applied from the accumulator to the seal member in the electromagnetic valve main body. The seal member is thus prevented from being excessively crushed due to the oil pressure, so that the sliding resistance of the seal member at the sliding portion can be maintained within an appropriate range. As a result, it is possible to normally actuate the oil path opening and closing valve element of the electromagnetic valve main body while maintaining the sealability of the seal member.

Also in the electromagnetic valve according to the first embodiment, the pressure regulation mechanism is disposed in the electromagnetic valve main body. Therefore, it is unnecessary to dispose such a pressure regulation mechanism in a transmission-side oil path (valve body) or in an accumulator-side oil path. It is thus possible to reduce an increase in size of the transmission (automatic transmission). It is also possible to easily configure the transmission-use oil pressure control device, using an existing accumulator.

A second embodiment provides a transmission-use oil pressure control device including: an oil pump that supplies an oil pressure to a transmission to be operated by the oil pressure; an accumulator that accumulates an oil pressure generated by the oil pump; an electromagnetic valve that includes an oil path opening and closing valve element connected to the accumulator and opening and closing an oil path between the accumulator and the transmission, and a seal member sealing against oil leakage from a sliding portion of the oil path opening and closing valve element in the opening and closing operation of the oil path opening and closing valve element; and a pressure regulation mechanism that regulates to release an internal pressure in the accumulator when the oil pressure in the accumulator rises to a predetermined pressure or more.

In the transmission-use oil pressure control device according to the second embodiment, as described above, the pressure regulation mechanism is disposed to regulate to release the internal pressure in the accumulator when the oil pressure in the accumulator rises to the predetermined pressure or more. Therefore, when the accumulator accumulates an oil pressure (internal pressure) being the predetermined pressure or more, the pressure regulation mechanism can prevent the excessive oil pressure from being applied from the accumulator to the seal member in the electromagnetic valve. The seal member is thus prevented from being excessively crushed due to the oil pressure, so that the sliding resistance of the seal member at the sliding portion can be maintained within an appropriate range. As a result, it is possible to normally actuate the oil path opening and closing valve element of the electromagnetic valve while maintaining the sealability of the seal member.

According to the present subject matter, as described above, it is possible to normally actuate an oil path opening and closing valve element of an electromagnetic valve main body while maintaining the sealability of a seal member.

DESCRIPTION OF PREFERRED EMBODIMENTS

Embodiments will be described below with reference to the drawings.

[First Exemplary Embodiment]

With reference to FIGS. 1 to 6, first, a description will be given of a configuration of an oil pressure control device 50 according to a first exemplary embodiment. It should be noted that the oil pressure control device 50 is an example of a "transmission-use oil pressure control device" in the appended claims.

(Schematic Configuration of Oil Pressure Control Device)

Figure 1:
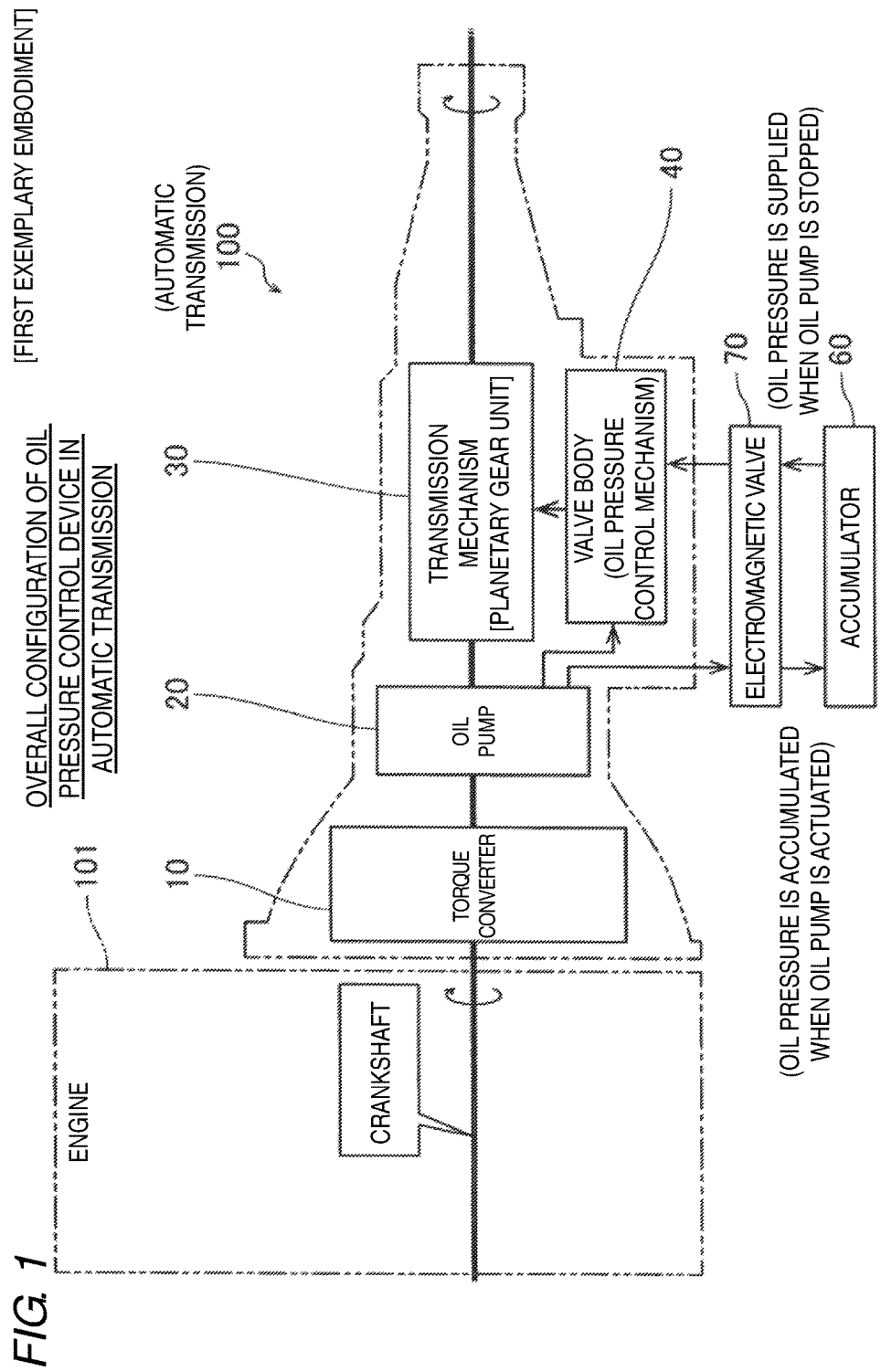
FIG. 1 illustrates an overall configuration of an automatic transmission including an oil pressure control device according to a first exemplary embodiment.
Figure 2:
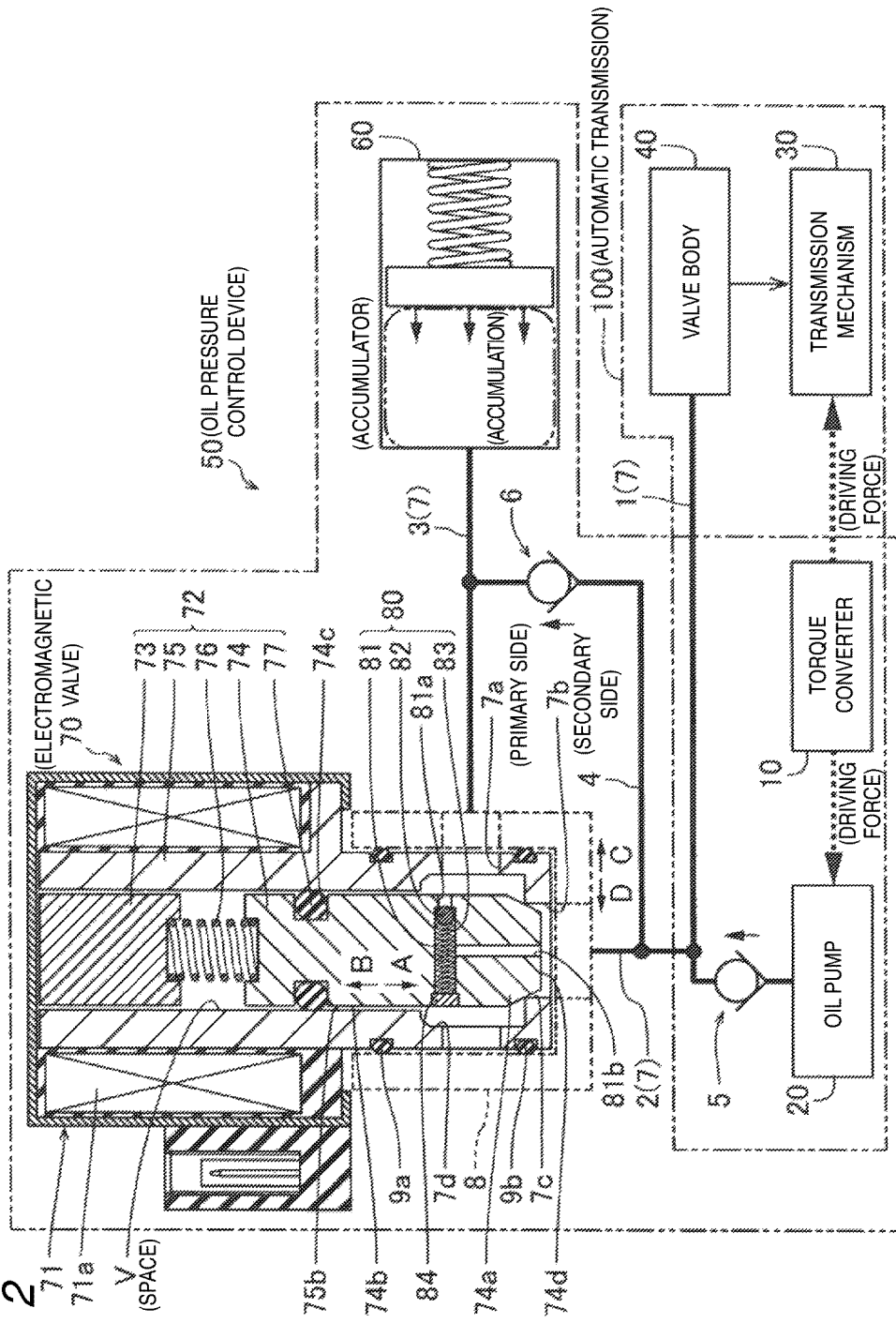
FIG. 2 illustrates a configuration of the oil pressure control device according to the first exemplary embodiment.

A vehicle (e.g., an automobile) is equipped with an automatic transmission 100. As illustrated in FIG. 1, the automatic transmission 100 includes a torque converter 10 that transmits a driving force of an engine 101, a mechanical oil pump 20 that generates a hydraulic pressure for oil pressure control from the driving force of the engine 101, a transmission mechanism 30 that can constitute multiple gear stages, using a planetary gear unit, and a valve body 40 that performs oil pressure control on the transmission mechanism 30. As illustrated in FIG. 2, the oil pressure control device 50 plays a role of controlling an oil pressure of a hydraulic fluid (AT fluid) to be supplied to the automatic transmission 100. It should be noted that the transmission mechanism 30 is an example of a "transmission" in the appended claims.

The automatic transmission 100 is also mounted on an automobile with an idling stop (engine stop) function. Accordingly, the oil pressure control device 50 includes an accumulator 60 and an electromagnetic valve 70 in addition to the mechanical oil pump 20. The accumulator 60 has a function of accumulating the oil pressure generated by the mechanical oil pump 20 and discharging the accumulated hydraulic fluid with a small amount of electric power consumption as required. The electromagnetic valve 70 has a function of opening an oil path from the accumulator 60. The accumulator 60 and the electromagnetic valve 70 are disposed near the valve body 40, for example, on a lower side of the automatic transmission 100.

According to the oil pressure control device 50, in returning from the idling stop state in which the mechanical oil pump 20 is not actuated (i.e., in restarting the engine), the oil pressure in the accumulator 60 is supplied to the transmission mechanism 30 via the valve body 40 in association with the opening operation of the electromagnetic valve 70. In the automatic transmission 100, thus, the transmission mechanism 30 promptly constitutes a predetermined gear stage in returning (prior to a start of running) without an influence of a delay in time until the mechanical oil pump 20 is actuated and then the predetermined oil pressure is obtained along with the engine restart.

As illustrated in FIG. 2, the mechanical oil pump 20 and the valve body 40 are connected to each other via an oil path 1 in the oil pressure control device 50. The oil path 1 is provided with a check valve 5 that prevents backflow of a hydraulic fluid into the mechanical oil pump 20. An oil path 2 is provided on the downstream side in the flow direction of the check valve 5. The oil path 2 branches off from the oil path 1 and is connected to an outlet port 7b of the electromagnetic valve 70. In addition, an inlet port 7a of the electromagnetic valve 70 is connected to the accumulator 60 via an oil path 3. The oil paths 2 and 3 are connected to each other via an oil path 4 bypassing the electromagnetic valve 70, and a check valve 6 is provided on the oil path 4. The check valve 6 plays a role of preventing the oil pressure in the accumulator 60 from flowing back to the oil path 1 via the oil path 4. It should be noted that a continuous oil path 7 from the accumulator 60 to the valve body 40 via the oil path 3, the electromagnetic valve 70, the oil path 2, and the oil path 1 is an example of an "oil path between an accumulator and a transmission" and a "second oil path" in the appended claims.

Figure 3:
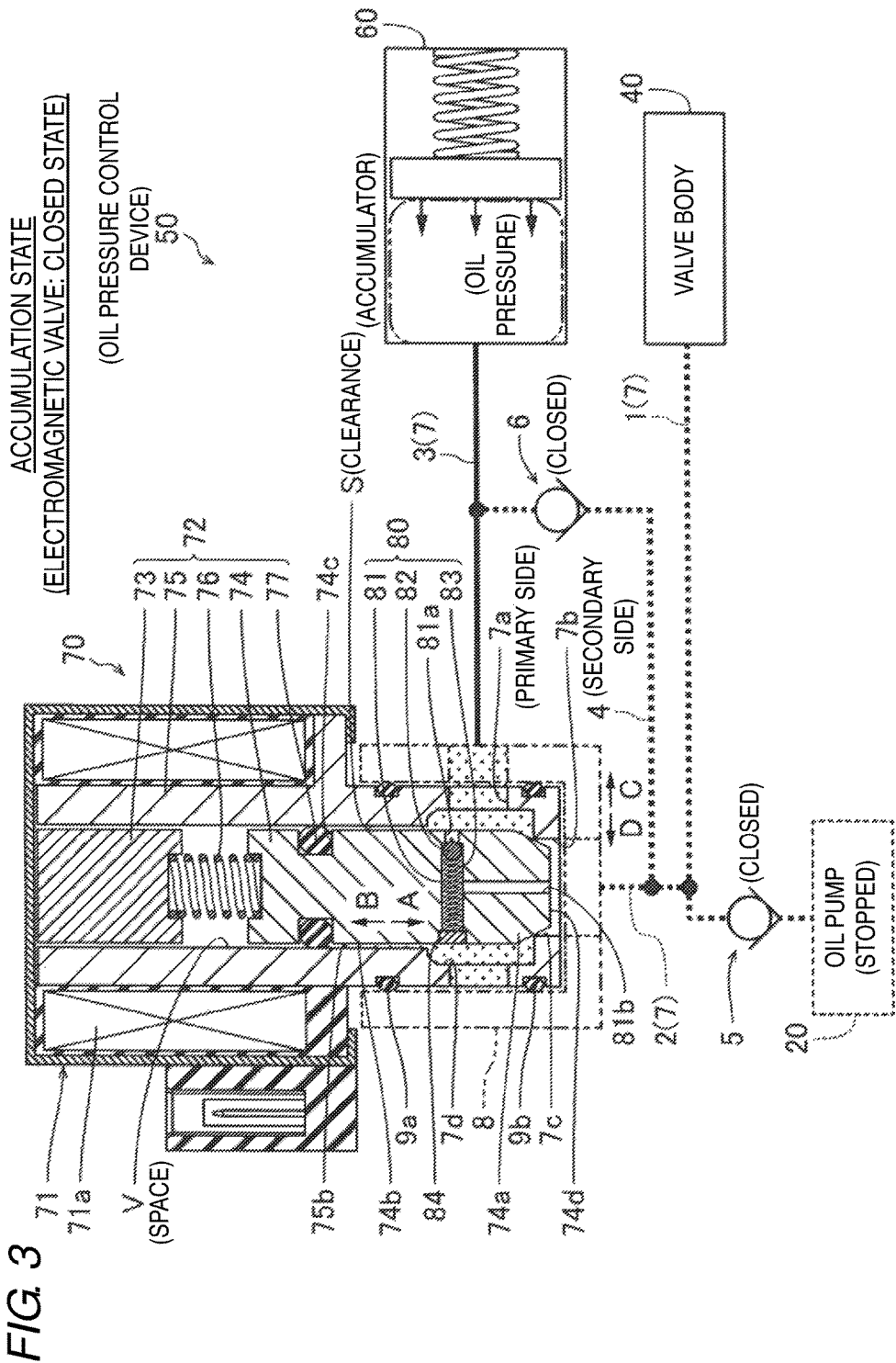
FIG. 3 illustrates a configuration (accumulation state) of the oil pressure control device according to the first exemplary embodiment.
Figure 6:
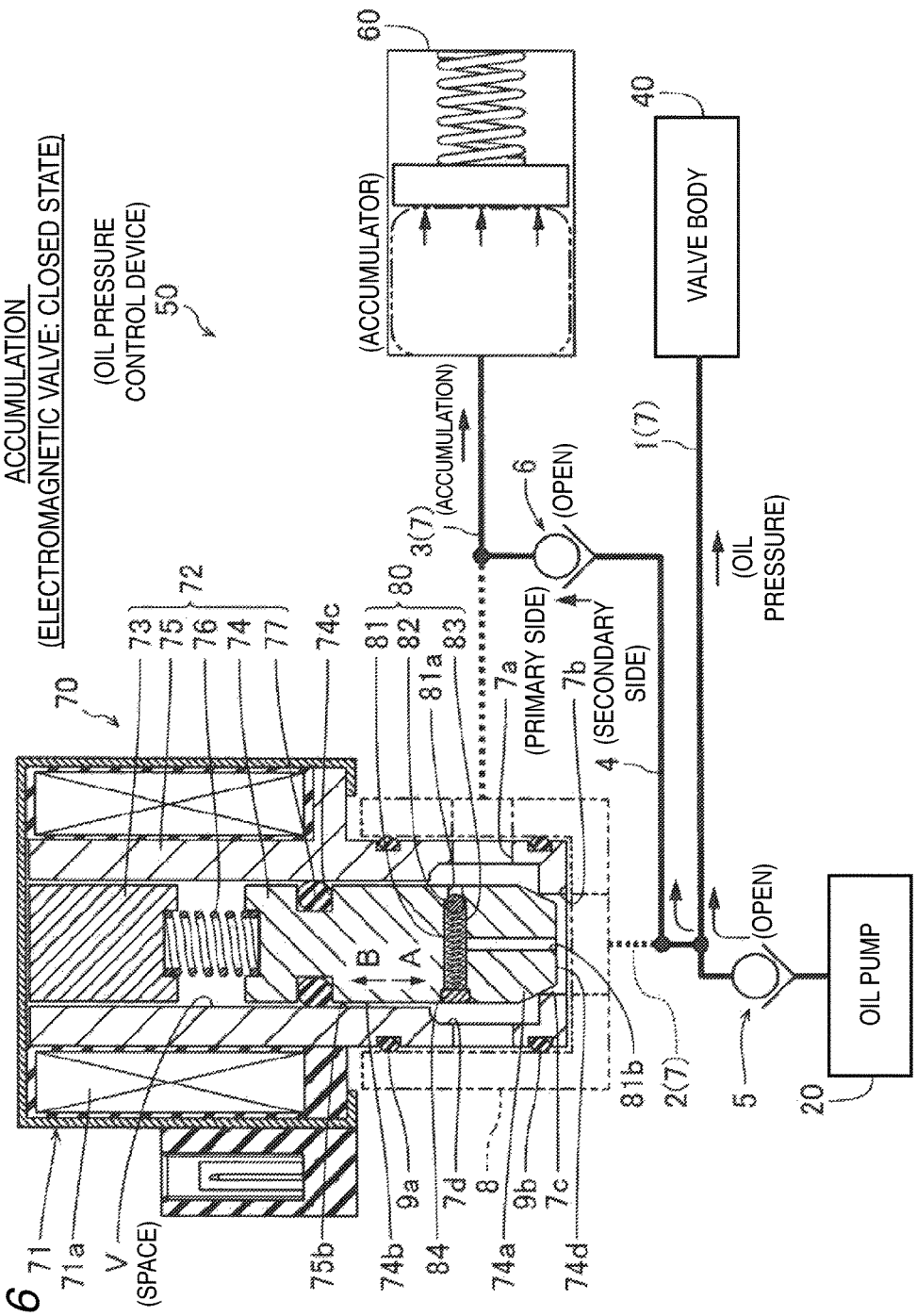
FIG. 6 illustrates a configuration (electromagnetic valve: closed state) of the oil pressure control device according to the first exemplary embodiment.

Next, a description will be given of the role of the oil pressure control device 50. During the operation of the engine, as illustrated in FIG. 6, the oil pump 20 is actuated to supply an oil pressure to the valve body 40. In addition, the oil pressure generated by the mechanical oil pump 20 is also supplied to the accumulator 60 via the oil path 4. At this time, the electromagnetic valve 70 is maintained in a closed state, and the oil pressure of the hydraulic fluid accumulated in the accumulator 60 is applied to the inlet port 7a via the oil path 3. As illustrated in FIG. 3, thus, the actuation of the oil pump 20 is stopped in the idling stop state.

Figure 5:
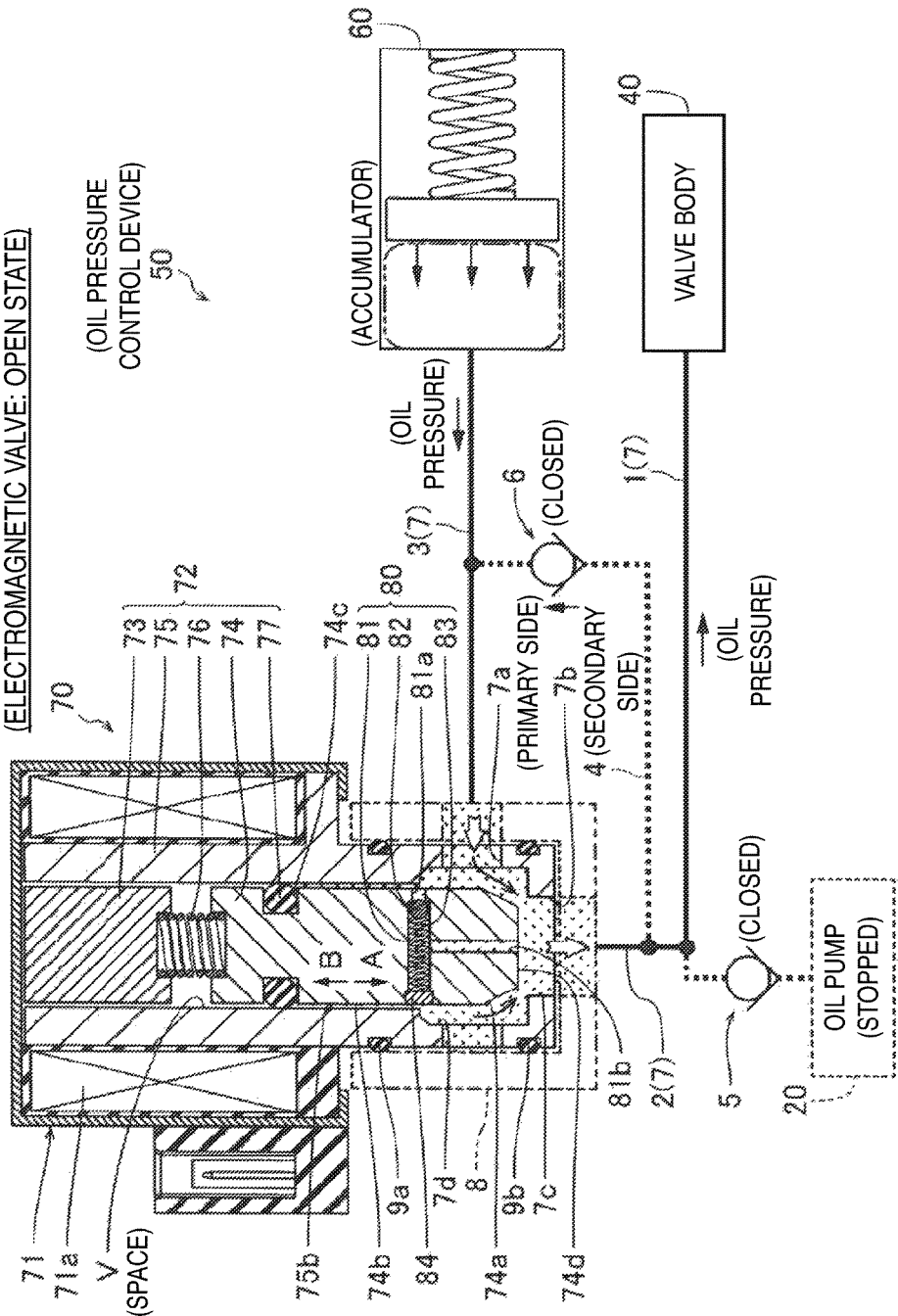
FIG. 5 illustrates a configuration (electromagnetic valve: open state) of the oil pressure control device according to the first exemplary embodiment.

Thereafter, when an occupant gradually takes his/her foot off a brake pedal (not illustrated) to restart the engine 101 (see FIG. 1), the electromagnetic valve 70 is energized and the electromagnetic valve 70 is switched to an open state, as illustrated in FIG. 5. The oil pressure (internal pressure) in the accumulator 60 is thus promptly supplied to the valve body 40 via the electromagnetic valve 70. After the start of the engine, as illustrated in FIG. 6, when the oil pressure in the mechanical oil pump 20 rises, the energization to the electromagnetic valve 70 is stopped and the electromagnetic valve 70 is switched to the closed state. An oil pressure supply source is thus switched from the accumulator 60 to the oil pump 20 and, thereafter, the oil pressure supply from the oil pump 20 to the valve body 40 and the accumulation of the oil pressure in the accumulator 60 are resumed.

As described above, the oil pressure control device 50 performs an assist function (see FIG. 5) of applying the oil pressure to the valve body 40 using the accumulated oil pressure in the accumulator 60 for a short time in returning from the idling stop state. In this case, since the accumulator 60 has high oil-pressure discharge responsiveness, the transmission mechanism 30 promptly constitutes a gear stage for starting the vehicle.

In the first exemplary embodiment, as illustrated in FIG. 3, the electromagnetic valve 70 includes a pressure regulation mechanism 80. In the closed state of the electromagnetic valve 70, when the accumulator 60-side oil pressure to be applied to the inlet port 7a (primary side) rises to a predetermined value P1 or more, the pressure regulation mechanism 80 releases to the outlet port 7b (secondary side) an increment of the internal pressure in the accumulator 60 from the predetermined value P1 to the current oil pressure. Next, a specific description will be given of the configuration of the electromagnetic valve 70 and the role of the pressure regulation mechanism 80. It should be noted that the predetermined value P1 is an example of a "predetermined pressure" in the appended claims.

(Configuration of Electromagnetic Valve)

The electromagnetic valve 70 includes a solenoid 71 having a bobbin and an electromagnetic coil 71a wound around the bobbin, and a main body 72 to which a fixed core 73 is fixed and in which an oil path opening and closing valve element (movable core) 74 is movably accommodated. The main body 72 includes a valve element accommodating portion 75 that accommodates therein the oil path opening and closing valve element 74 in a movable manner, a spring 76 that is disposed in a space V between the fixed core 73 and the oil path opening and closing valve element 74 and is formed of a compression coil spring constantly biasing the oil path opening and closing valve element 74 in a direction of arrow A, and an O-ring 77 made of a resin and mounted to the oil path opening and closing valve element 74. It should be noted that the main body 72 and the O-ring 77 are an example of an "electromagnetic valve main body" and an example of a "seal member", respectively, in the appended claims.

A groove 74c having a circumferential shape is formed in an outer peripheral face 74b of the oil path opening and closing valve element 74, and the O-ring 77 is mounted to the groove 74c. An outer diameter of the oil path opening and closing valve element 74 is slightly smaller than an inner diameter of the valve element accommodating portion 75, and a clearance S is formed between the outer peripheral face 74b and an inner peripheral face 75b of the valve element accommodating portion 75. The oil path opening and closing valve element 74 is thus held slidably in a state in which a surface of the O-ring 77 is in contact with the inner peripheral face 75b with a predetermined frictional force. In addition, the clearance S and the space V are separated from each other by the O-ring 77.

The valve element accommodating portion 75 has the inlet port 7a and the outlet port 7b through which a hydraulic fluid flows, and a valve seat (orifice) 7c to be opened and closed by the oil path opening and closing valve element 74. In the electromagnetic valve 70, the valve element accommodating portion 75 is mounted to a pipe member 8 (its schematic shape is shown with a two-dot chain line) that forms a part of the oil path 7. Specifically, O-rings 9a and 9b are mounted to the outer peripheral face of the valve element accommodating portion 75. Moreover, the inlet port 7a and the outlet port 7b are partitioned from each other by the O-ring 9b. A portion corresponding to an internal oil path 7d to the inlet port 7a expands circumferentially along the outer peripheral face 74b of the oil path opening and closing valve element 74 and extends upward (i.e., in a direction of arrow B). A hydraulic fluid flowing from the inlet port 7a via the pipe member 8 thus spreads all over the clearance S along the outer peripheral face 74b of the oil path opening and closing valve element 74.

The hydraulic fluid (oil pressure) flowing from the inlet port 7a is also applied to the surface of the O-ring 77 via the clearance S. At this time, since the clearance S filled with the hydraulic fluid and the space V accommodating therein the spring 76 are partitioned by the O-ring 77, the main body 72 is configured to prevent leakage of the hydraulic fluid to the space V as much as possible. Accordingly, the O-ring 77 is required to have a contact force (sealability) for reliably sealing the clearance S between the outer peripheral face 74b and the inner peripheral face 75b.

As an operation of the electromagnetic valve 70, in a non-excited state in which the electromagnetic coil 71a is demagnetized, as illustrated in FIG. 3, the oil path opening and closing valve element 74 is biased in the direction of arrow A by a biasing force of the spring 76. A tapered valve portion 74a of the oil path opening and closing valve element 74 is thus seated on the valve seat 7c to close the internal oil path 7d. When the electromagnetic coil 71a is excited, as illustrated in FIG. 5, the oil path opening and closing valve element 74 is attracted in the direction of arrow B by an electromagnetic force against the biasing force of the spring 76. The seated valve portion 74a thus moves in the direction of arrow B to open the oil path 7, so that the inlet port 7a (primary side) and the outlet port 7b (secondary side) communicate with each other.

(Configuration of Pressure Regulation Mechanism in Electromagnetic Valve)

Figure 4:
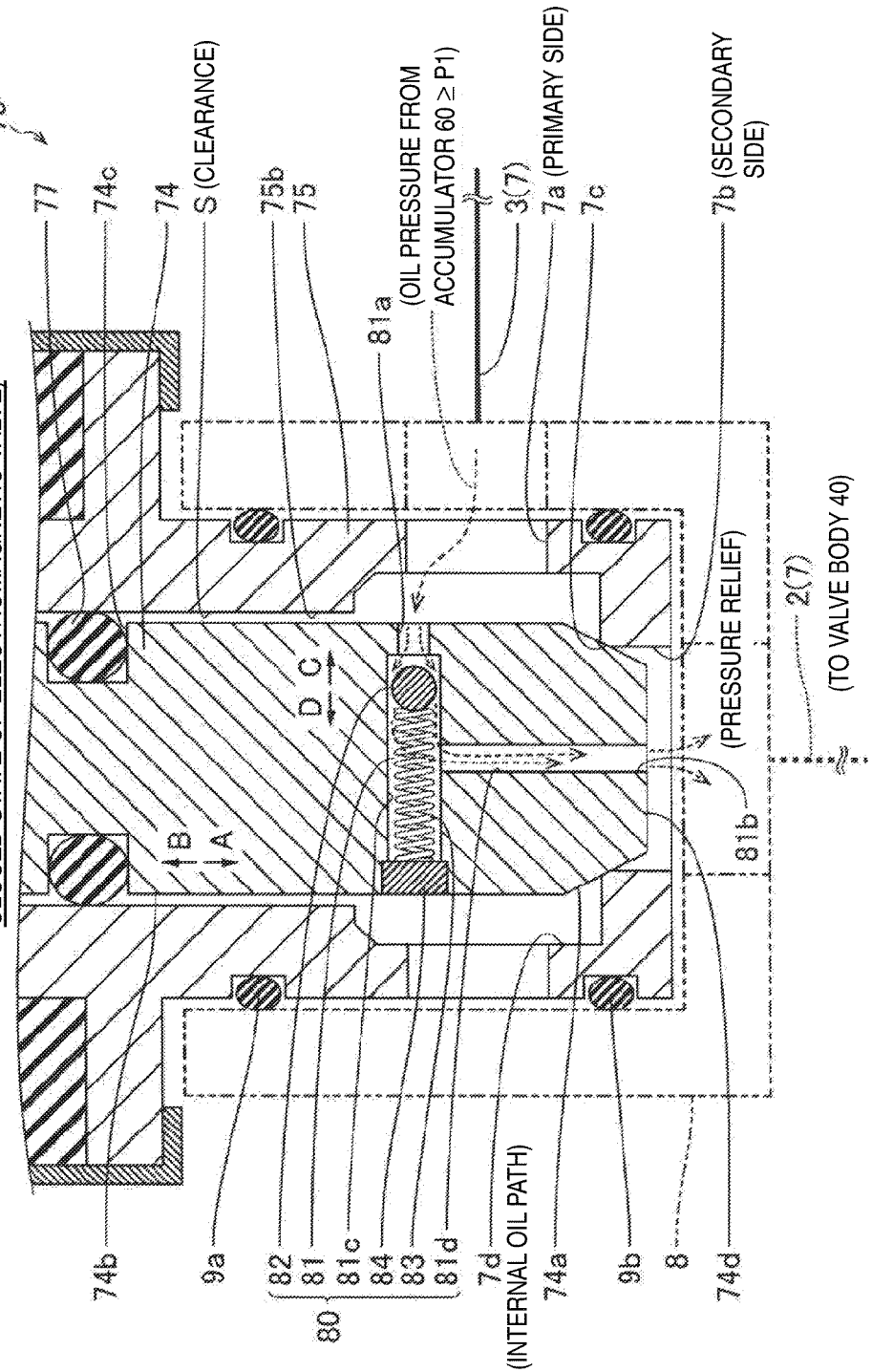
FIG. 4 is an enlarged view of a pressure regulation mechanism and its vicinity in an electromagnetic valve of the oil pressure control device illustrated in FIG. 3.

In the first exemplary embodiment, the pressure regulation mechanism 80 is incorporated in the main body 72 of the electromagnetic valve 70. Specifically, as illustrated in FIG. 4, the pressure regulation mechanism 80 includes a pressure regulation passage 81 that extends through the oil path opening and closing valve element 74, a pressure regulating valve element (ball valve) 82 that is made of a metal, has a spherical shape, and opens and closes the pressure regulation passage 81, a spring 83 that is formed of a compression coil spring made of a metal and biases the pressure regulating valve element 82 in a direction of closing the pressure regulation passage 81, and a holding member 84 that holds the spring 83 from a side opposite from the pressure regulating valve element 82. It should be noted that the pressure regulation passage 81 and the spring 83 are an example of an "oil pressure relief passage" and an example of a "biasing member", respectively, in the appended claims.

The pressure regulation passage 81 has an opening 81a that is open at the outer peripheral face 74b of the oil path opening and closing valve element 74, and an opening 81b that is open at a distal end face 74d of the valve portion 74a in the oil path opening and closing valve element 74. The opening 81a is located on the outer peripheral face 74b closer to the valve portion 74a with respect to a position where the O-ring 77 is mounted. The opening 81b is formed at a position (distal end face 74d) communicating with the outlet port 7b (secondary side) in the state in which the electromagnetic valve 70 (internal oil path 7d) illustrated in FIG. 4 is closed.

The pressure regulation passage 81 includes a first passage 81c having a cross-sectional area larger than an opening area of the opening 81a and extending in a direction of arrow D, and a second passage 81d extending linearly in the direction of arrow A from an approximately middle portion of the first passage 81c. A diameter of the pressure regulating valve element 82 being a ball valve is smaller than an inner diameter of the first passage 81c by about several tens of micrometers. The holding member 84 is fitted into the first passage 81c from the direction of arrow D in a state in which the pressure regulating valve element 82 and the spring 83 are inserted in this order into the first passage 81c. The spring 83 is adjusted such that a biasing force of the spring 83 for the pressure regulating valve element 82 has the predetermined value P1 in the state in which the pressure regulating valve element 82 is seated on a diameter-reduced portion in the first passage 81c. In a state in which no oil pressure is applied to the opening 81a or the oil pressure is less than the predetermined value P1, the pressure regulation passage 81 is thus closed by the pressure regulating valve element 82 biased by the spring 83.

The pressure regulation mechanism 80 is configured as follows. When the oil pressure in the main body 72 (the portion corresponding to the internal oil path 7d from the inlet port 7a to the valve seat 7c) rises to the predetermined value P1 or more, the pressure regulation mechanism 80 moves the pressure regulating valve element 82 from the seated position in the opening direction (the direction of arrow D) against the biasing force (in a direction of arrow C) of the spring 83. At this time, a clearance of about several tens of micrometers is formed between the pressure regulating valve element 82 and an inner peripheral face of the first passage 81c. With this operation, moreover, the inlet port 7a (primary side) and the outlet port 7b (secondary side) in the main body 72 communicate with each other via the pressure regulation passage 81 even when the electromagnetic valve 70 (internal oil path 7d) is closed. The hydraulic fluid to be applied to the inlet port 7a is thus gradually distributed to the outlet port 7b via the pressure regulation passage 81. As a result, an excessive oil pressure (pressure) to be applied from the accumulator 60 to the main body 72 is released.

When the oil pressure in the accumulator 60 falls below the predetermined value P1 along with the release of the oil pressure, the pressure regulating valve element 82 completely closes the pressure regulation passage 81 as illustrated in FIG. 3. In the electromagnetic valve 70, accordingly, an oil pressure not exceeding the predetermined value P1 is applied to the inlet port 7a (primary side) by the oil pressure regulating function of the pressure regulation mechanism 80.

Accordingly, even when the hydraulic fluid filled in the clearance S between the outer peripheral face 74b and the inner peripheral face 75b reaches the groove 74c and presses the O-ring 77, the pressing force does not exceed the predetermined value P1. This configuration prevents the O-ring 77 from being excessively deformed (crushed) in its cross section. In other words, the O-ring 77 of which the cross section is prevented from being excessively deformed is slidably held with a frictional force in an appropriate range to the inner peripheral face 75b of the valve element accommodating portion 75. In the electromagnetic valve 70, accordingly, the electromagnetic coil 71a is excited and the oil path opening and closing valve element 74 is smoothly actuated, unlike the cases where the frictional force increases due to the crush of the O-ring 77 to hinder the oil path opening and closing valve element 74 from being normally actuated.

In the pressure regulation mechanism 80, even when the spring 83 is contracted fully, the pressure regulating valve element 82 does not reach the connection position (the inlet of the second passage 81d) of the second passage 81d to the first passage 81c. This configuration is achieved by a correlation between a size and a spring constant of the spring 83 and a position where the second passage 81d is formed. This configuration prevents the pressure regulating valve element 82 from moving in the direction of arrow D at the time of oil pressure regulation to close the inlet to the second passage 81d. The oil pressure control device 50 including the electromagnetic valve 70 according to the first exemplary embodiment is configured as described above.

(Advantageous Effects of First Exemplary Embodiment)

The first exemplary embodiment can produce the following advantageous effects.

In the first exemplary embodiment, as described above, the electromagnetic valve 70 is configured such that the main body 72 includes the pressure regulation mechanism 80 that releases the oil pressure (internal pressure) to be applied from the accumulator 60 to the O-ring 77 when the oil pressure on the primary side (the portion corresponding to the internal oil path 7d from the inlet port 7a to the valve seat 7c) in the main body 72 rises to the predetermined value P1 or more. This configuration can prevent the excessive oil pressure from being applied from the accumulator 60 to the O-ring 77 mounted to the oil path opening and closing valve element 74 by the operation of the pressure regulation mechanism 80 in the cases where the accumulator 60 accumulates the oil pressure (internal pressure) being the predetermined value P1 or more. The O-ring 77 can thus be prevented from being excessively crushed due to the oil pressure, and the sliding resistance of the O-ring 77 to the inner peripheral face 75b of the valve element accommodating portion 75 can be maintained within an appropriate range. As a result, it is possible to normally actuate the oil path opening and closing valve element 74 of the electromagnetic valve 70 (main body 72) while maintaining the sealability of the O-ring 77. In addition, since the electromagnetic valve 70 operates smoothly, hydraulic assist can be ensured for the valve body 40 in returning from the idling stop state, without impairing the characteristic of the accumulator 60 with high oil-pressure discharge responsiveness.

Also in the first exemplary embodiment, the pressure regulation mechanism 80 is disposed in the main body 72 of the electromagnetic valve 70. With this configuration, the valve body 40 or the like of the automatic transmission 100 does not need to include the pressure regulation mechanism 80. It is therefore possible to reduce an increase in size of the automatic transmission 100 (valve body 40). The accumulator 60 does not also need to include the pressure regulation mechanism 80. It is therefore possible to easily configure the oil pressure control device 50 using the existing accumulator 60.

Also in the first exemplary embodiment, the electromagnetic valve 70 is configured such that the pressure regulation mechanism 80 is disposed in the oil path opening and closing valve element 74 that opens and closes the oil path 7 (internal oil path 7d) between the accumulator 60 and the valve body 40. It is thus possible to effectively utilize the existing oil path opening and closing valve element 74 and to dispose the pressure regulation mechanism 80 in the existing oil path opening and closing valve element 74. Unlike the cases where such a pressure regulation mechanism is disposed on the valve element accommodating portion 75 side, it is therefore possible to obtain the electromagnetic valve 70 that includes the pressure regulation mechanism 80 without causing an increase in size of the electromagnetic valve 70.

Also in the first exemplary embodiment, the pressure regulation mechanism 80 is configured to include the pressure regulation passage 81 that is disposed in the oil path opening and closing valve element 74 and establishes a connection between the primary side (inlet port 7a) and the secondary side (outlet port 7b) of the oil path opening and closing valve element 74, and the pressure regulating valve element 82 that is movably disposed in the first passage 81c of the pressure regulation passage 81 and opens and closes the pressure regulation passage 81. When the oil pressure in the main body 72 rises to the predetermined value P1 or more, the pressure regulation mechanism 80 moves the pressure regulating valve element 82 in the opening direction (direction of arrow D) to release the oil pressure (pressure) from the primary side (inlet port 7a) to the secondary side (outlet port 7b) of the oil path opening and closing valve element 74 via the pressure regulation passage 81. It is thus possible to easily release the oil pressure in the main body 72 to the secondary side through the clearance between the pressure regulating valve element 82 and the inner peripheral face of the first passage 81c, by the opening and closing operation of the pressure regulating valve element 82 in the pressure regulation passage 81.

Also in the first exemplary embodiment, the spring 83 is disposed in the first passage 81c of the pressure regulation passage 81 to bias the pressure regulating valve element 82 in the closing direction (direction of arrow C). When the oil pressure rises to the predetermined value P1 or more, the pressure regulation mechanism 80 moves the pressure regulating valve element 82 in the opening direction (direction of arrow D) against the biasing force of the spring 83 to release the oil pressure (pressure) from the primary side to the secondary side of the oil path opening and closing valve element 74 via the pressure regulation passage 81. It is thus possible to cause the pressure regulating valve element 82 to easily exert the pressure regulation function only by previously designing the spring 83 such that the pressing force against the pressure regulating valve element 82 becomes the predetermined value P1 in the state in which the pressure regulating valve element 82 is seated on the diameter-reduced portion in the first passage 81c.

Also in the first exemplary embodiment, the electromagnetic valve 70 serving as a control valve for the accumulator 60 includes the pressure regulation mechanism 80. It is thus possible to effectively prevent occurrence of a malfunction of the electromagnetic valve 70 due to the excessive crush of the O-ring 77 in returning from the idling stop state. It is therefore possible to normally operate the automatic transmission 100, using the accumulator 60 serving as an oil pressure supply source, without consuming electric power in the idling stop state.

[Second Exemplary Embodiment]

With reference to FIGS. 2 and 7 to 9, next, a description will be given of a second exemplary embodiment. The second exemplary embodiment concerns a configuration of an electromagnetic valve 270 that includes a pressure regulation mechanism 80 and has a function of a check valve 6 (see FIG. 2) described in the first exemplary embodiment. It should be noted that similar constituent elements to those described in the first exemplary embodiment are denoted with the same reference signs in the figures.

(Configuration of Electromagnetic Valve)

Figure 7:
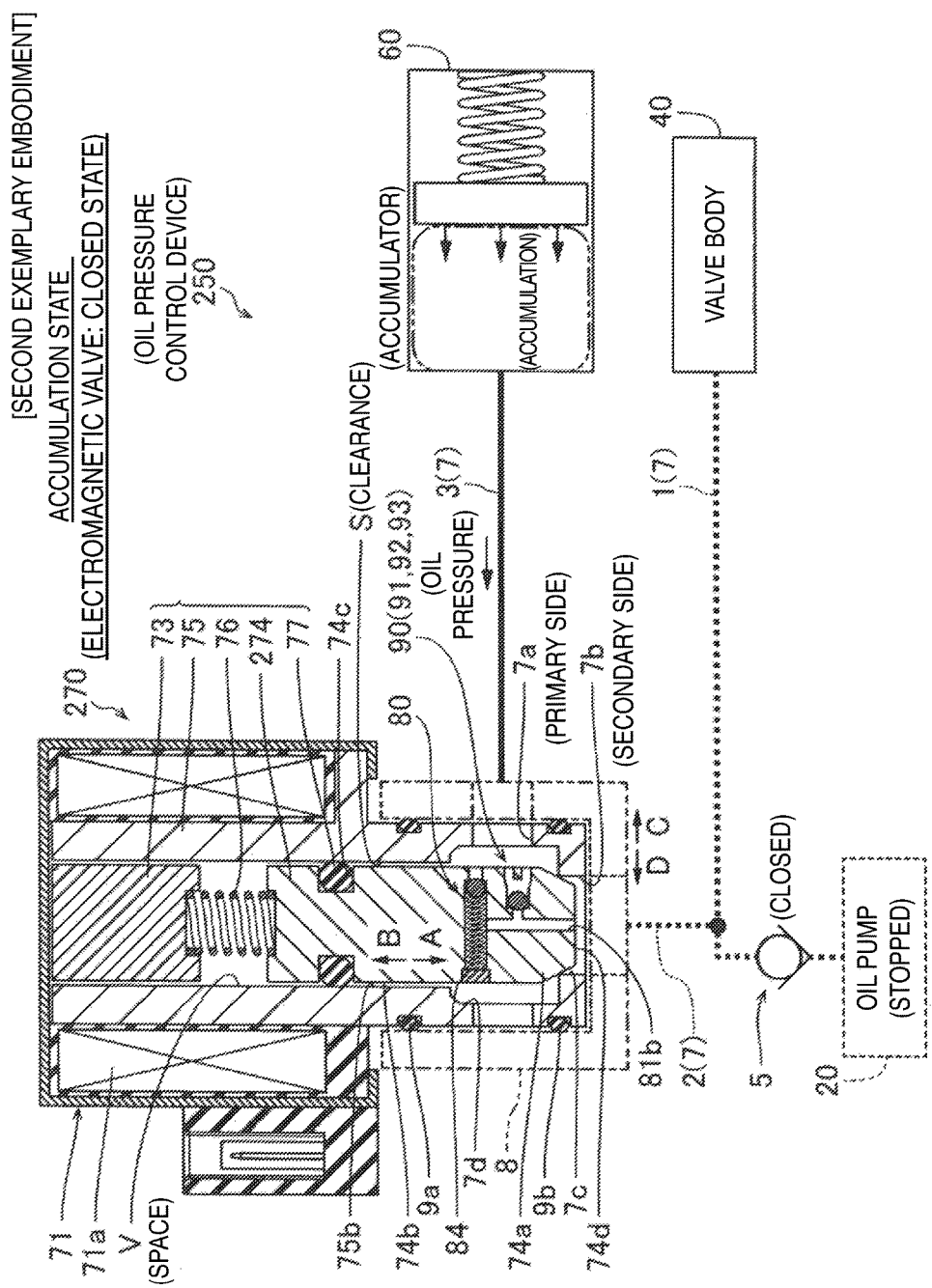
FIG. 7 illustrates a configuration of an oil pressure control device according to a second exemplary embodiment.

As illustrated in FIG. 7, an oil pressure control device 250 according to the second exemplary embodiment includes the electromagnetic valve 270. The electromagnetic valve 270 includes, in addition to the pressure regulation mechanism 80, a backflow prevention mechanism 90 disposed in an oil path opening and closing valve element (movable core) 274. It should be noted that the oil pressure control device 250 is an example of a "transmission-use oil pressure control device" in the appended claims.

(Configuration of Backflow Prevention Mechanism)

Figure 8:
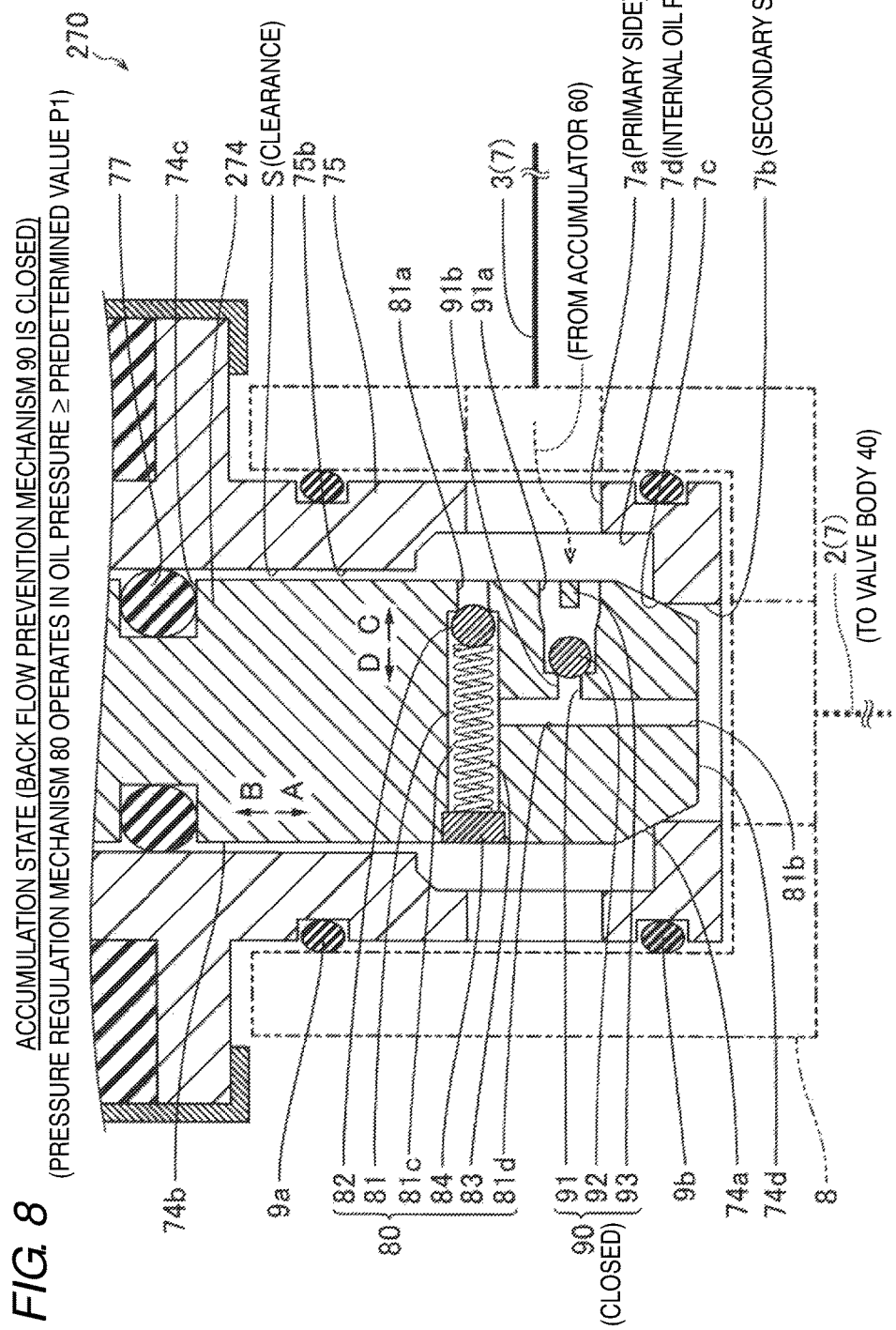
FIG. 8 is an enlarged view of a backflow prevention mechanism and its vicinity in the electromagnetic valve of the oil pressure control device illustrated in FIG. 7.

As illustrated in FIG. 8, specifically, the backflow prevention mechanism 90 is disposed on a portion branching off from a second passage 81d of a pressure regulation passage 81 in the oil path opening and closing valve element 274. In other words, the backflow prevention mechanism 90 includes an oil path 91 having an opening 91a that branches off from the second passage 81d and is open at an outer peripheral face 74b, and a ball valve 92 that is made of a metal and opens and closes the oil path 91.

The oil path 91 has a diameter that is reduced in the vicinity of a connection portion 91b to the second passage 81d. The ball valve 92 moves in a direction of arrow D and is seated on the diameter-reduced portion to close the oil path 91. The diameter of the oil path 91 is enlarged on the opening 91a side, and a restraining portion 93 is formed to partially close the opening 91a. When the ball valve 92 moves in a direction of arrow C to come into contact with the restraining portion 93, a clearance of about several tens of micrometers is formed between the ball valve 92 and an inner peripheral face of the diameter-enlarged portion of the oil path 91.

In a state in which an oil pressure is already accumulated in an accumulator 60 and the electromagnetic valve 270 (internal oil path 7d) is closed, thus, even when the oil pressure is applied from the accumulator 60 to an inlet port 7a, the ball valve 92 is seated on the diameter-reduced portion in the oil path 91 to close the oil path 91. Therefore, a hydraulic fluid does not flow back into an oil path 1 via an outlet port 7b (secondary side). Also when the oil pressure is regulated by the pressure regulation mechanism 80 (during a pressure releasing operation) or when the internal oil path 7d in which the oil path opening and closing valve element 274 is attracted is opened, the ball valve 92 also moves in the direction of arrow D to close the oil path 91.

Figure 9:
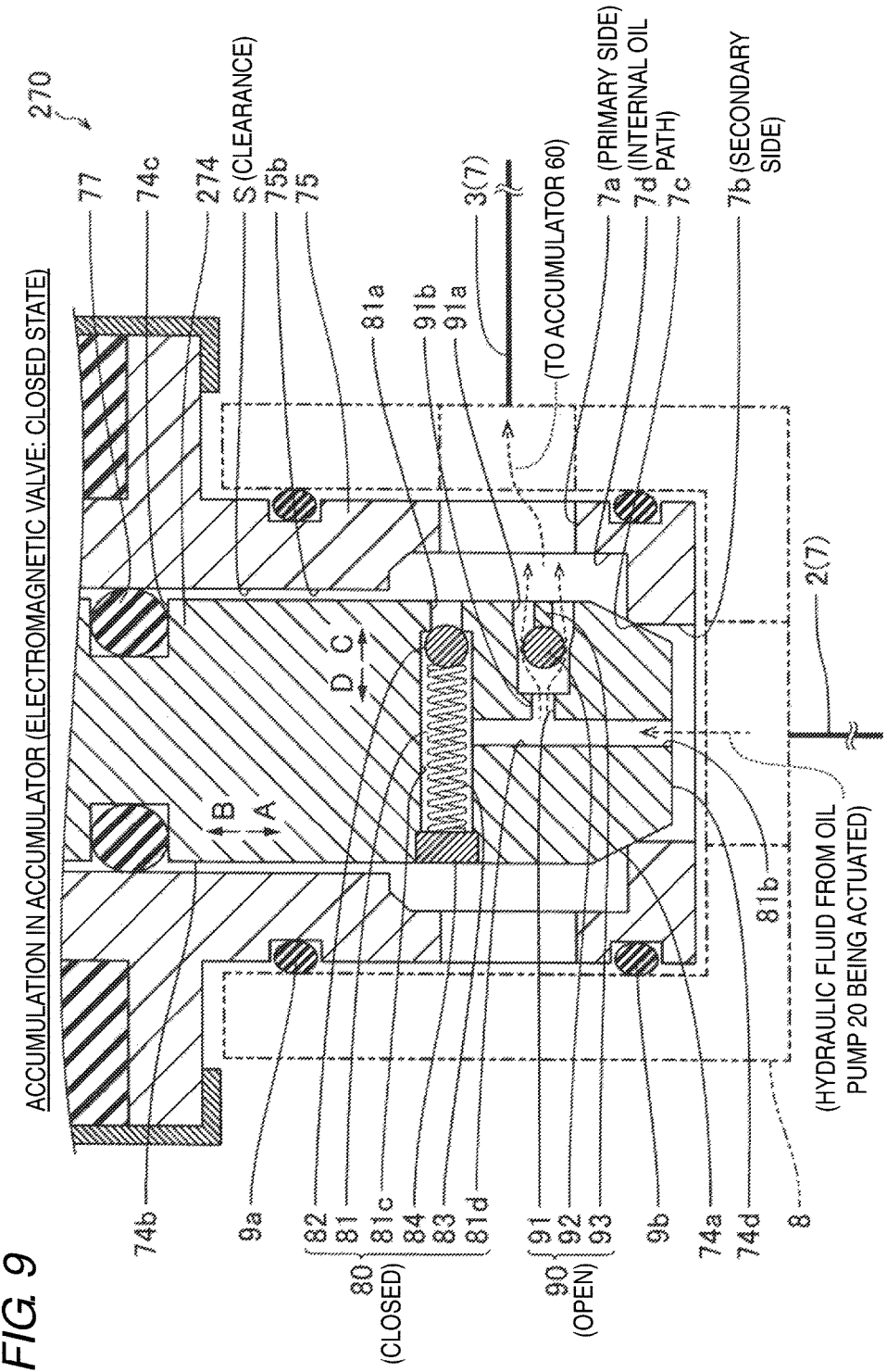
FIG. 9 is an enlarged view of the backflow prevention mechanism and its vicinity in the electromagnetic valve of the oil pressure control device illustrated in FIG. 7.

As illustrated in FIG. 9, on the other hand, in a state in which an oil pump 20 is actuated and a hydraulic fluid is accumulated in the accumulator 60, even when the electromagnetic valve 270 (internal oil path 7d) is closed, the oil pressure from the oil pump 20 pushes the ball valve 92 in the direction of arrow C via the second passage 81d and the oil path 91. When the ball valve 92 moves and comes into contact with the restraining portion 93, the hydraulic fluid is distributed to (supplied to) the inlet port 7a through the clearance formed between the ball valve 92 and the inner peripheral face of the diameter-enlarged portion of the oil path 91. The electromagnetic valve 270 including the pressure regulation mechanism 80 and the backflow prevention mechanism 90 is configured as described above. It should be noted that other configurations in the second exemplary embodiment are similar to those in the first exemplary embodiment.

(Advantageous Effects of Second Exemplary Embodiment)

In the second exemplary embodiment, as described above, the electromagnetic valve 270 includes the backflow prevention mechanism 90 that prevents backflow of oil from the accumulator 60 into the oil pump 20 accumulating an oil pressure. Unlike cases where the check valve 6 (see FIG. 2) or the like is additionally disposed on the oil pressure path other than the electromagnetic valve 270, it is thus possible to provide the electromagnetic valve 270 having the backflow prevention function. It is therefore possible to simplify the entire configuration of the oil pressure control device 250.

Also in the second exemplary embodiment, the oil path opening and closing valve element 274 includes the backflow prevention mechanism 90 in addition to the pressure regulation mechanism 80. With this configuration, the existing oil path opening and closing valve element 274 can be utilized effectively, and the pressure regulation mechanism 80 and the backflow prevention mechanism 90 can be disposed in the existing oil path opening and closing valve element 274. It is therefore possible to easily obtain the electromagnetic valve 270 having the backflow prevention function without causing an increase in size. It should be noted that other advantageous effects of the second exemplary embodiment are similar to those of the first exemplary embodiment.

[Third Exemplary Embodiment]

Figure 10:
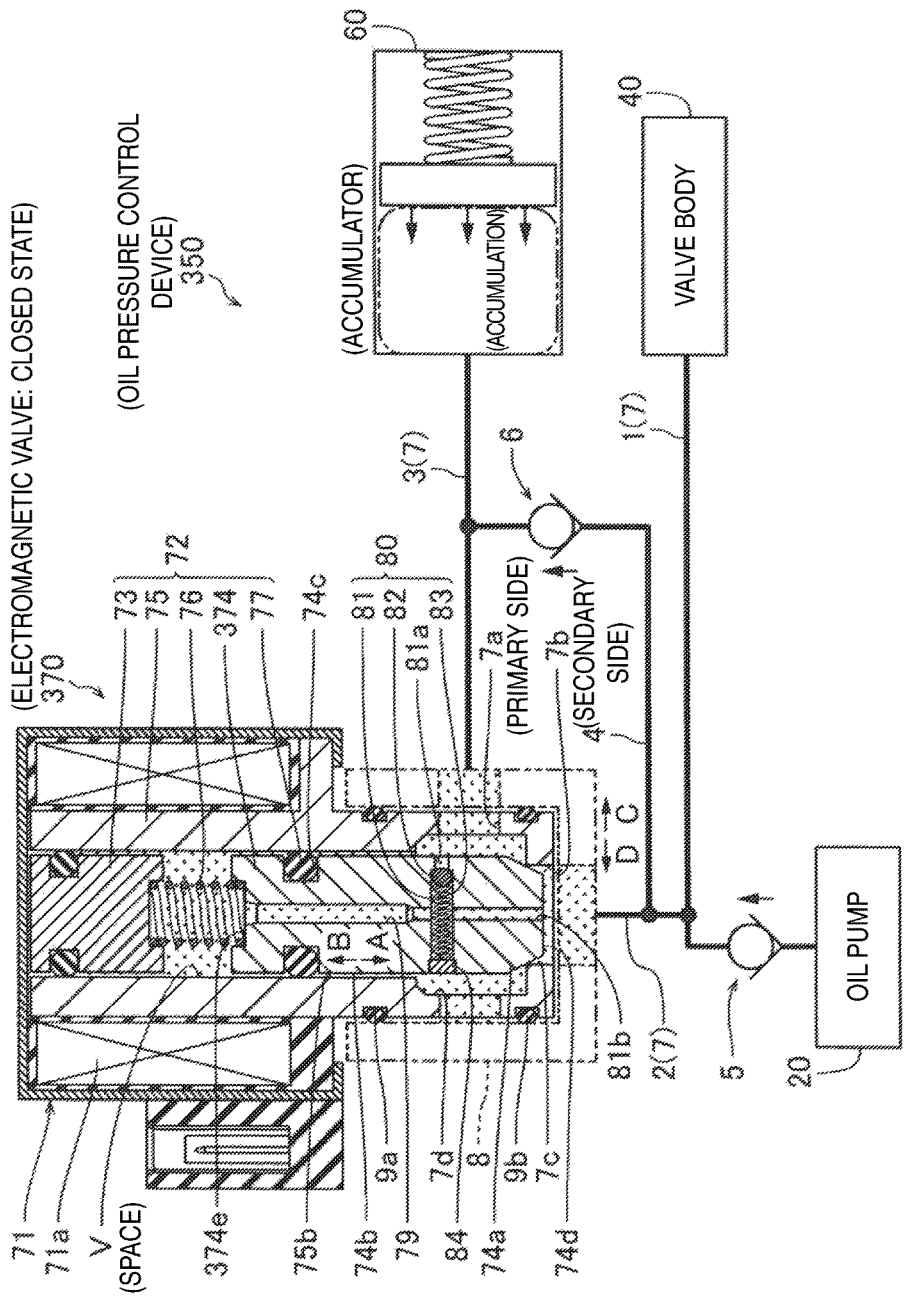
FIG. 10 illustrates a configuration of an oil pressure control device according to a third exemplary embodiment.

With reference to FIGS. 2 and 10, next, a description will be given of a third exemplary embodiment. The third exemplary embodiment concerns a configuration of an electromagnetic valve 370 in which a pressure regulation mechanism 80 includes a pressure equalizing oil path 79. It should be noted that similar constituent elements to those described in the first exemplary embodiment are denoted with the same reference signs in the figures.

(Configuration of Electromagnetic Valve)

As illustrated in FIG. 10, an oil pressure control device 350 according to the third exemplary embodiment includes the electromagnetic valve 370. In the electromagnetic valve 370, the pressure regulation mechanism 80 is incorporated in an oil path opening and closing valve element (movable core) 374. The electromagnetic valve 370 also includes the pressure equalizing oil path 79 in addition to the pressure regulation mechanism 80. It should be noted that the oil pressure control device 350 is an example of a "transmission-use oil pressure control device" in the appended claims.

Specifically, the oil path opening and closing valve element 374 includes the pressure equalizing oil path 79 that extends through the oil path opening and closing valve element 374 so as to establish communication between a first passage 81c constituting the pressure regulation mechanism 80 and a spring seat 374e to which a spring 83 is fixed. In other words, a second passage 81d and the pressure equalizing oil path 79 establish communication between a space V where a fixed core 73 and the oil path opening and closing valve element 374 oppose each other and an outlet port 7b (secondary side). In a state in which the electromagnetic valve 370 is closed, thus, a hydraulic fluid at the outlet port 7b is also filled in the space V in which the spring 83 is fitted via the second passage 81d and the pressure equalizing oil path 79. Accordingly, the oil path opening and closing valve element 374 is in a neutral state in terms of pressure since the same oil pressure acts thereon from both a distal end face 74d side and a spring seat 374e side.

When an electromagnetic coil 71a is excited and the oil path opening and closing valve element 374 is attracted in a direction of arrow B, the hydraulic fluid in the space V is pushed out toward the outlet port 7b via the pressure equalizing oil path 79. In return for this, the volume of the space V is easily reduced. As a result, in the electromagnetic valve 370, as compared with the electromagnetic valve 70 (see FIG. 2) described in the first exemplary embodiment, the oil path opening and closing valve element 374 can be promptly actuated (moved) in the direction of arrow B even when the spring 83 with a smaller biasing force and the downsized electromagnetic coil 71a with a smaller attracting force are used.

Also in this case, an O-ring 77 is required to have a contact force for reliably sealing a clearance S between an outer peripheral face 74b and an inner peripheral face 75b. However, an excessive contact force of the O-ring 77 tends to obstruct the smooth operation of the oil path opening and closing valve element 374 in the cases where the downsized electromagnetic coil 71a is used.

In view of this, according to the third exemplary embodiment, the pressure regulation mechanism 80 is also applied to the electromagnetic valve 370 configured as described above. With this configuration, even if an oil pressure, which is a predetermined value P1 or more and excessively crushes the O-ring 77 in its cross section, is applied to an inlet port 7a, the pressure regulation mechanism 80 is operated to release this oil pressure, so that only a pressure less than the predetermined value P1 is applied to the O-ring 77. Accordingly, a pressure in a main body 72 is regulated without impairing the sealability of the O-ring 77 that partitions the clearance S and the space V, and the oil path opening and closing valve element 374 is operated smoothly even with a smaller attracting force.

When the pressure regulation mechanism 80 operates in the state in which the electromagnetic valve 370 is closed, a hydraulic fluid flows from the first passage 81c to the second passage 81d. That is, since the hydraulic fluid is previously filled in the space V via the pressure equalizing oil path 79, the hydraulic fluid at the time of pressure relief does not flow in this direction. In addition, even when the spring 83 is contracted fully, a pressure regulating valve element 82 does not reach the connection position (an inlet of the pressure equalizing oil path 79) of the pressure equalizing oil path 79 to the first passage 81c. It should be noted that other configurations in the third exemplary embodiment are similar to those in the first exemplary embodiment.

(Advantageous Effects of Third Exemplary Embodiment)

In the third exemplary embodiment, as described above, the electromagnetic valve 370 provided with the pressure equalizing oil path 79 includes the pressure regulation mechanism 80. It is thus possible to smoothly operate the oil path opening and closing valve element 374 with a smaller attracting force of the downsized electromagnetic coil 71a, by regulating the oil pressure (pressure) on the inlet port 7a in the main body 72, without impairing the sealability of the O-ring 77 partitioning the clearance S and the space V. In this respect, there is great significance of applying the pressure regulation mechanism 80 to the electromagnetic valve 370.

Also in the third exemplary embodiment, the oil path opening and closing valve element 374 is configured such that the pressure equalizing oil path 79 is connected to the first passage 81c of the pressure regulation mechanism 80. With this configuration, a pressure equalizing communication path, via which the outlet port 7b of the electromagnetic valve 370 communicates with the space V, can be formed in the electromagnetic valve 370 by effectively utilizing the second passage 81d of the pressure regulation mechanism 80. In the third exemplary embodiment, the pressure equalizing oil path 79 is formed to operate the oil path opening and closing valve element 374 with a smaller attracting force of the downsized electromagnetic coil 71a. Accordingly, the partial configuration (second passage 81d) of the pressure regulation mechanism 80 also contributes to the downsizing of the electromagnetic valve 370. Therefore, disposing the pressure regulation mechanism 80 in the electromagnetic valve 370 provided with the pressure equalizing oil path 79 is very advantageous. It should be noted that other advantageous effects of the third exemplary embodiment are similar to those of the first exemplary embodiment.

[Fourth Exemplary Embodiment]

Figure 11:
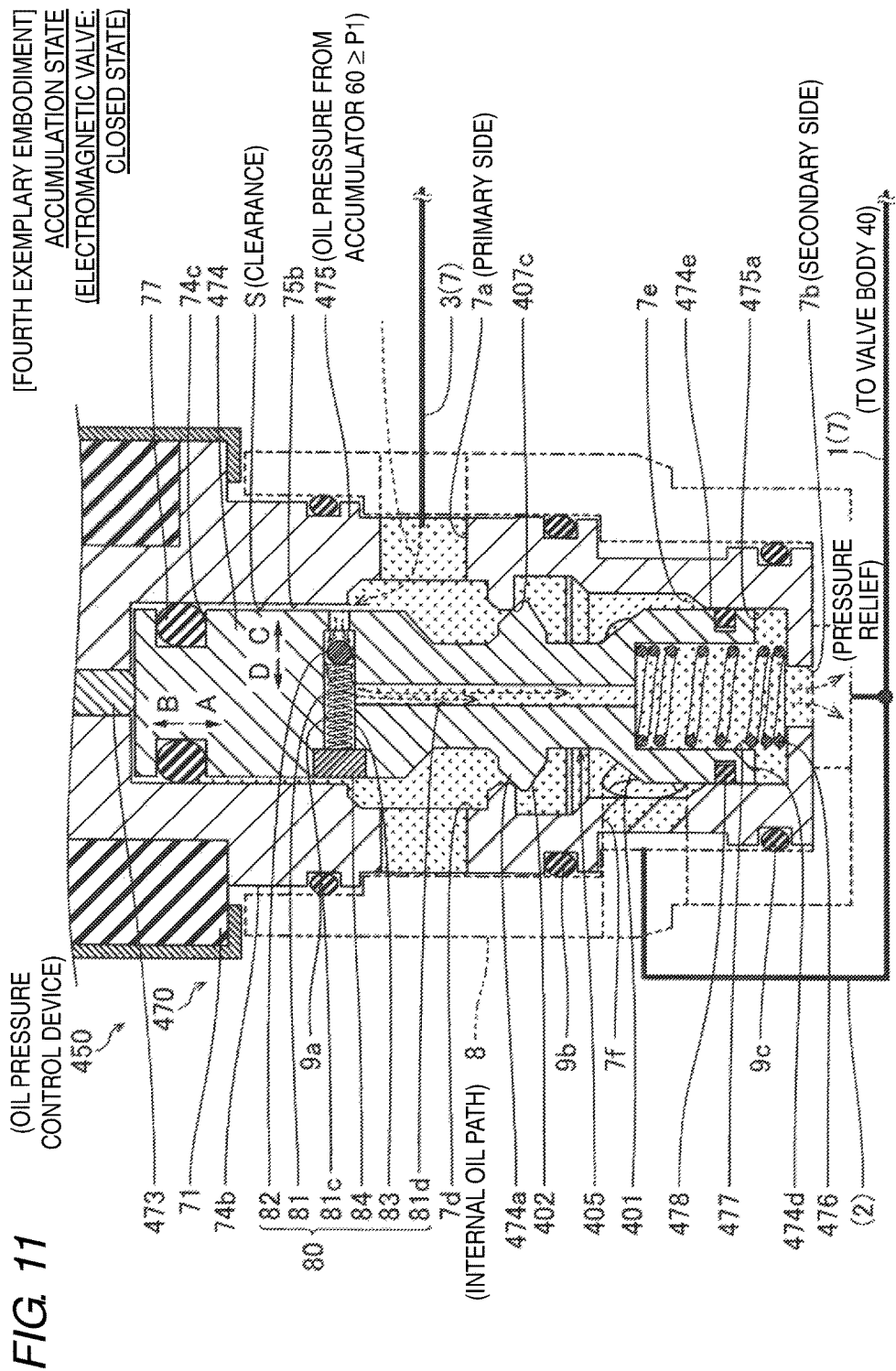
FIG. 11 illustrates a configuration of an electromagnetic valve according to a fourth exemplary embodiment.
Figure 12:
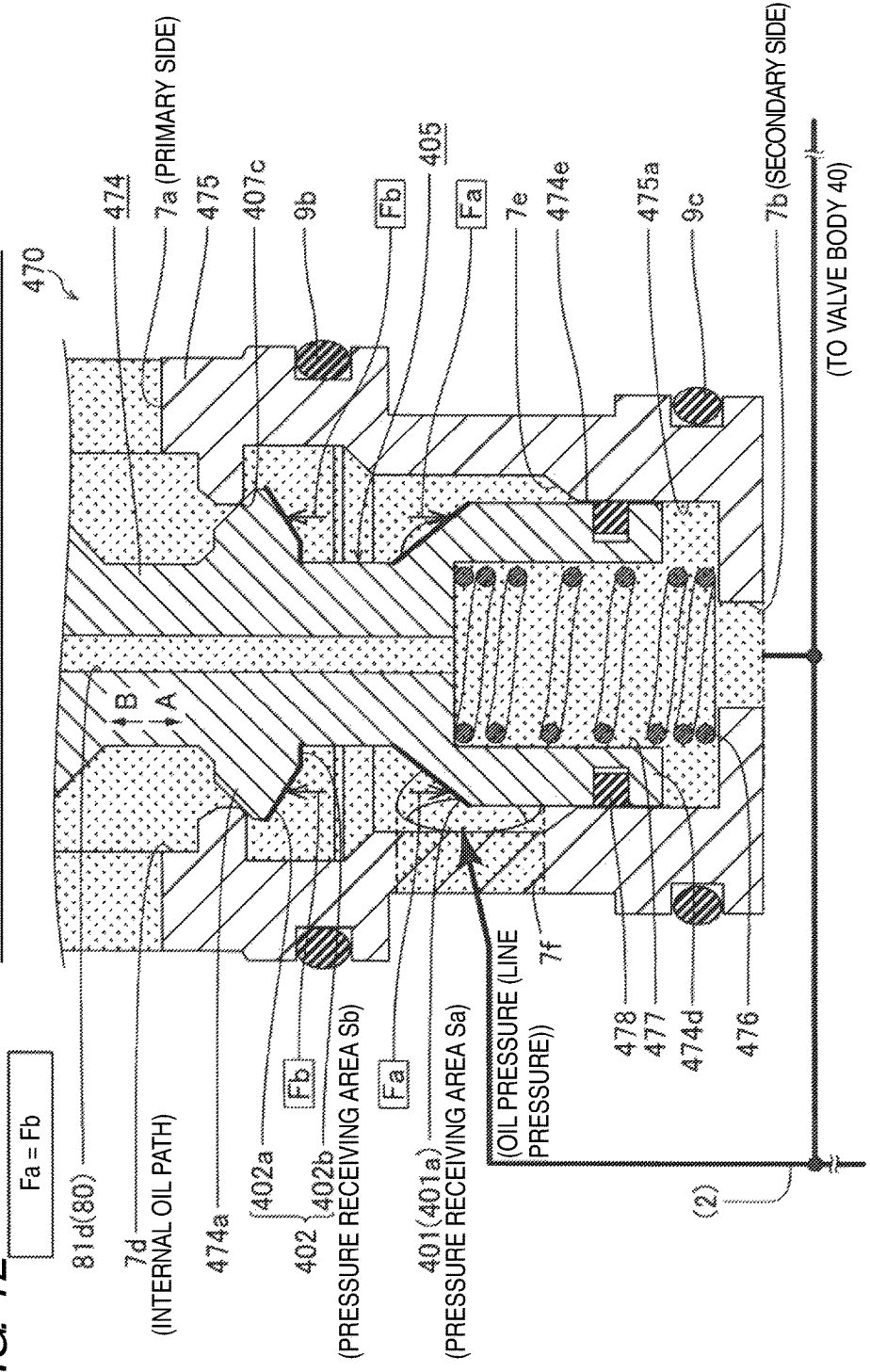
FIG. 12 is an enlarged view of an oil path opening and closing valve element and its vicinity in the electromagnetic valve according to the fourth exemplary embodiment.
Figure 13:
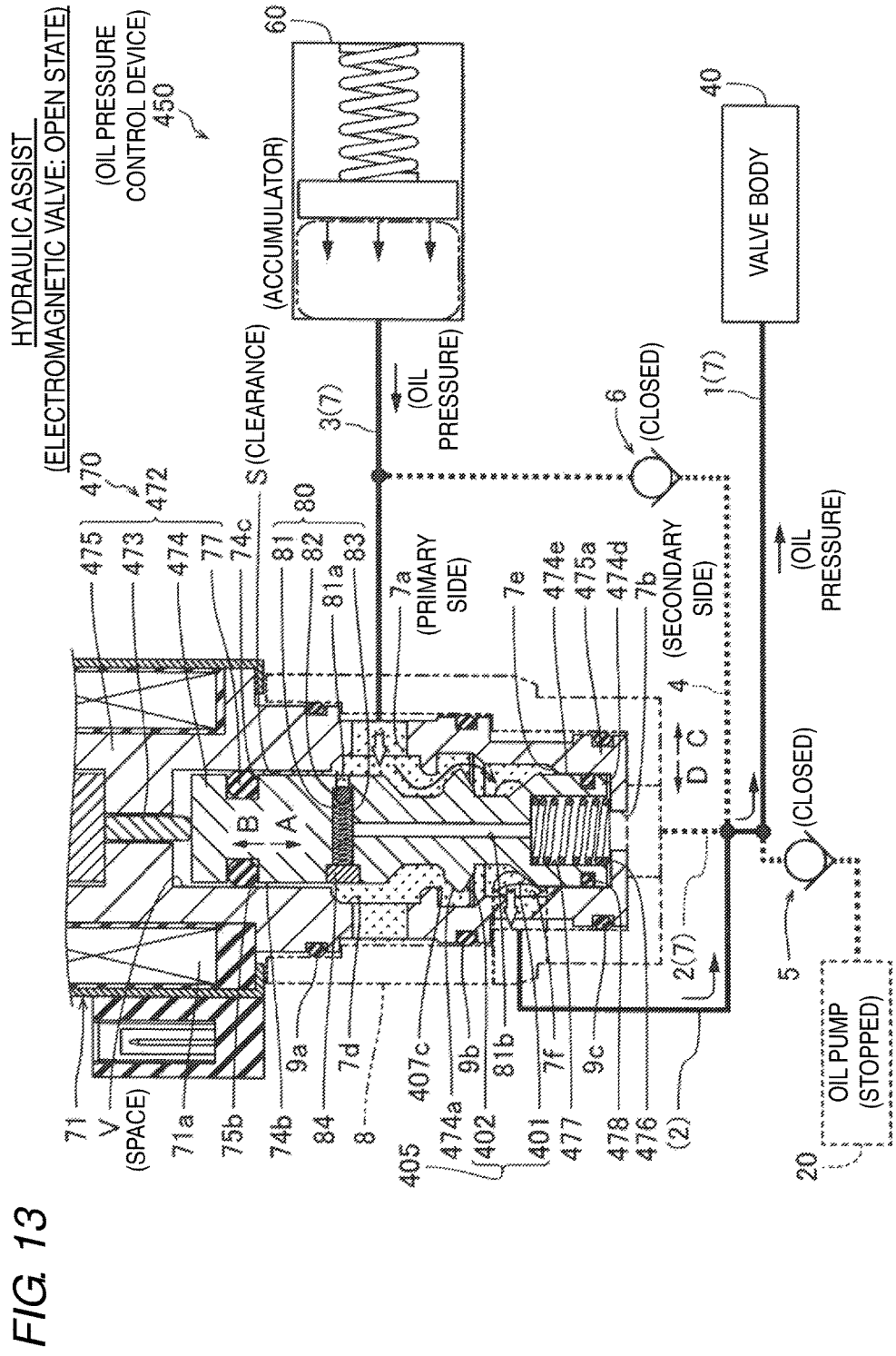
FIG. 13 illustrates a configuration (electromagnetic valve: open state) of an oil pressure control device according to the fourth exemplary embodiment.

With reference to FIGS. 11 to 13, next, a description will be given of a fourth exemplary embodiment. The fourth exemplary embodiment concerns a configuration in which a pressure regulation mechanism 80 is incorporated in an oil path opening and closing valve element 474 different in structure from those described in the first to third exemplary embodiments. It should be noted that similar constituent elements to those described in the first exemplary embodiment are denoted with the same reference signs in the figures.

(Configuration of Electromagnetic Valve)

As illustrated in FIG. 11, an oil pressure control device 450 according to the fourth exemplary embodiment includes an electromagnetic valve 470. The electromagnetic valve 470 includes a main body 472 (see FIG. 13). The main body 472 includes a valve element accommodating portion 475 that accommodates therein the oil path opening and closing valve element 474 in a movable manner, and a spring 476 that always biases the oil path opening and closing valve element 474 in a direction of arrow B. In the electromagnetic valve 470, when a solenoid 71 is excited, the oil path opening and closing valve element 474 moves together with a movable core 473 in a direction of arrow A to open an oil path 7 (internal oil path 7d). It should be noted that the oil pressure control device 450 and the main body 472 are an example of a "transmission-use oil pressure control device" and an example of an "electromagnetic valve main body", respectively, in the appended claims.

The oil path opening and closing valve element 474 includes a valve portion 474a that opens and closes the internal oil path 7d, a pressure receiving portion 405 that extends from the valve portion 474a in the direction of arrow A and has an outer peripheral face including a portion narrowed toward an axial center of the oil path opening and closing valve element 474, and a holding portion 477 that has a recessed shape and holds the spring 476 in a distal end 474d, on a side of the direction of arrow A, of the oil path opening and closing valve element 474. It should be noted that the direction of arrow A and the direction of arrow B are an example of "one direction" and an example of "the other direction", respectively, in the appended claims.

The valve element accommodating portion 475 has a valve element holding portion 475a that holds the pressure receiving portion 405 and distal end 474d of the oil path opening and closing valve element 474 in a reciprocable manner. Specifically, a circumferential sliding member 478 is mounted to an outer peripheral face 474e of the distal end 474d. In the oil path opening and closing valve element 474, thus, the distal end 474d slides in the direction of arrow A (B) with respect to an inner peripheral face of the valve element holding portion 475a via the sliding member 478. The valve element accommodating portion 475 has, in addition to the internal oil path 7d, an internal oil path 7e formed on the side of the direction of arrow A with respect to a valve seat 407c. The internal oil path 7e communicates with an oil path 2, to which an oil pressure in an oil pump 20 is applied, via a port 7f formed at a position opposing the pressure receiving portion 405 of the valve element accommodating portion 475. The electromagnetic valve 470 (main body 472 (see FIG. 13)) is mounted to a pipe member 8 (shown with a two-dot chain line) with O-rings 9a to 9c interposed between the electromagnetic valve 470 and the pipe member 8.

In the fourth exemplary embodiment, as illustrated in FIG. 12, the oil path opening and closing valve element 474 has a first pressure receiving face 401 that receives an oil pressure (line pressure) in the oil path 2 closer to the oil pump 20 (see FIG. 13) when the oil path opening and closing valve element 474 moves in the direction of arrow A (downward) to open the oil path 7, and a second pressure receiving face 402 that receives the oil pressure (line pressure) in the oil path 2 closer to the oil pump 20 when the oil path opening and closing valve element 474 moves in the direction of arrow B (upward) to close the oil path 7. The second pressure receiving face 402 is formed of a lower face, on the side of the direction of arrow A, of the valve portion 474a having a tapered shape. Specifically, the second pressure receiving face 402 is formed of the lower face including a circumferential inclined face 402a that is inclined obliquely upward from an inner diameter side toward an outer diameter side of the oil path opening and closing valve element 474 and a circumferential flat face 402b on an inner diameter side of the circumferential inclined face 402a. The first pressure receiving face 401 is formed of an upper face opposing the second pressure receiving face 402 on the side of the direction of arrow A. In other words, the first pressure receiving face 401 is formed of the upper face including a circumferential inclined face 401*a* that is inclined obliquely downward from the inner diameter side toward the outer diameter side of the oil path opening and closing valve element 474. In addition, the pressure receiving portion 405 is formed such that a pressure receiving area Sa of the first pressure receiving face 401 and a pressure receiving area Sb of the second pressure receiving face 402 are equal to each other (Sa=Sb).

In the electromagnetic valve 470, accordingly, a force Fa to move the oil path opening and closing valve element 474 in the direction of arrow A (a component of force, to press the first pressure receiving face 401 (inclined face 401*a*) downward, of the line pressure) and a force Fb to move the oil path opening and closing valve element 474 in the direction of arrow B (a component of force, to press the second pressure receiving face 402 (inclined face 402*a* and flat face 402*b*) upward, of the line pressure) are always equally applied to the pressure receiving portion 405 of the oil path opening and closing valve element 474 (Fa=Fb). In other words, in the pressure receiving portion 405, the narrowed portion of the outer peripheral face is formed such that the force Fa and the force Fb are opposite in direction and have the same strength.

Thus, as illustrated in FIG. 13, the oil pressure in the oil path 2 acts on the first pressure receiving face 401 and the second pressure receiving face 402 of the pressure receiving portion 405 in the state of Fa=Fb (see FIG. 12). Therefore, during a period of time in which the oil pressure (line pressure) is generated on the oil path 2, the oil path opening and closing valve element 474 is in a neutral state so as to be movable in both the direction of arrow A and the direction of arrow B. Accordingly, the oil path opening and closing valve element 474 is immediately moved, along with energization of the electromagnetic valve 470, in the direction of arrow A without an influence of the oil pressure in the oil path 2. An oil pressure in an accumulator 60 is thus promptly supplied to a valve body 40 via the electromagnetic valve 470 (internal oil paths 7*d* and 7*e*). Moreover, even when the oil pressure (line pressure) in the oil path 2 rises along with the supply of the oil pressure from the accumulator 60, the line pressure acts equally on the first pressure receiving face 401 and the second pressure receiving face 402 (Fa=Fb). This configuration therefore avoids the oil path opening and closing valve element 474 from moving in the direction of closing the internal oil path 7*d* (direction of arrow B) owing to the rise of the oil pressure in the oil path 2.

As illustrated in FIG. 11, moreover, a second passage 81*d* of the pressure regulation mechanism 80 extends through the pressure receiving portion 405 in the direction of arrow A and is open at the holding portion 477. Also in the electromagnetic valve 470, accordingly, in the state in which the valve portion 474*a* closes the internal oil path 7*d* (non-excitation state), when the accumulator 60-side oil pressure, which is applied to (a portion corresponding to the internal oil path 7*d* from an inlet port 7*a* to the valve seat 407*c*) in the main body 472, rises to a predetermined value P1 or more, a pressure regulating valve element 82 is opened, and the inlet port 7*a* and an outlet port 7*b* communicate with each other via the second passage 81*d*. It should be noted that other configurations in the fourth exemplary embodiment are similar to those in the first exemplary embodiment.

(Advantageous Effects of Fourth Exemplary Embodiment)

In the fourth exemplary embodiment, as described above, the oil path opening and closing valve element 474 includes the pressure receiving portion 405 having the first pressure receiving face 401 receiving the line pressure in the oil path 2 when the oil path opening and closing valve element 474 moves in the direction of arrow A and the second pressure receiving face 402 receiving the line pressure in the oil path 2 when the oil path opening and closing valve element 474 moves in the direction of arrow B. Moreover, the pressure receiving area Sa of the first pressure receiving face 401 and the pressure receiving area Sb of the second pressure receiving face 402 are equal to each other. The oil path opening and closing valve element 474 can thus be easily maintained in the neutral state so as to be movable in both the direction of arrow A and the direction of arrow B during the period of time in which the line pressure is generated on the oil path 2. Accordingly, the oil path opening and closing valve element 474 can be reliably moved, along with the energization of the electromagnetic valve 470, in the direction of arrow A without the influence of the oil pressure in the oil path 2. Furthermore, even when the oil pressure (line pressure) in the oil path 2 rises along with the supply of the oil pressure from the accumulator 60, the line pressure acts equally on the first pressure receiving face 401 and the second pressure receiving face 402 (Fa=Fb). This configuration can therefore avoid the oil path opening and closing valve element 474 from moving in the direction of closing the internal oil path 7*d* owing to the rise of the oil pressure in the oil path 2. It should be noted that other advantageous effects of the fourth exemplary embodiment are similar to those of the first exemplary embodiment.

[Fifth Exemplary Embodiment]

Figure 14:
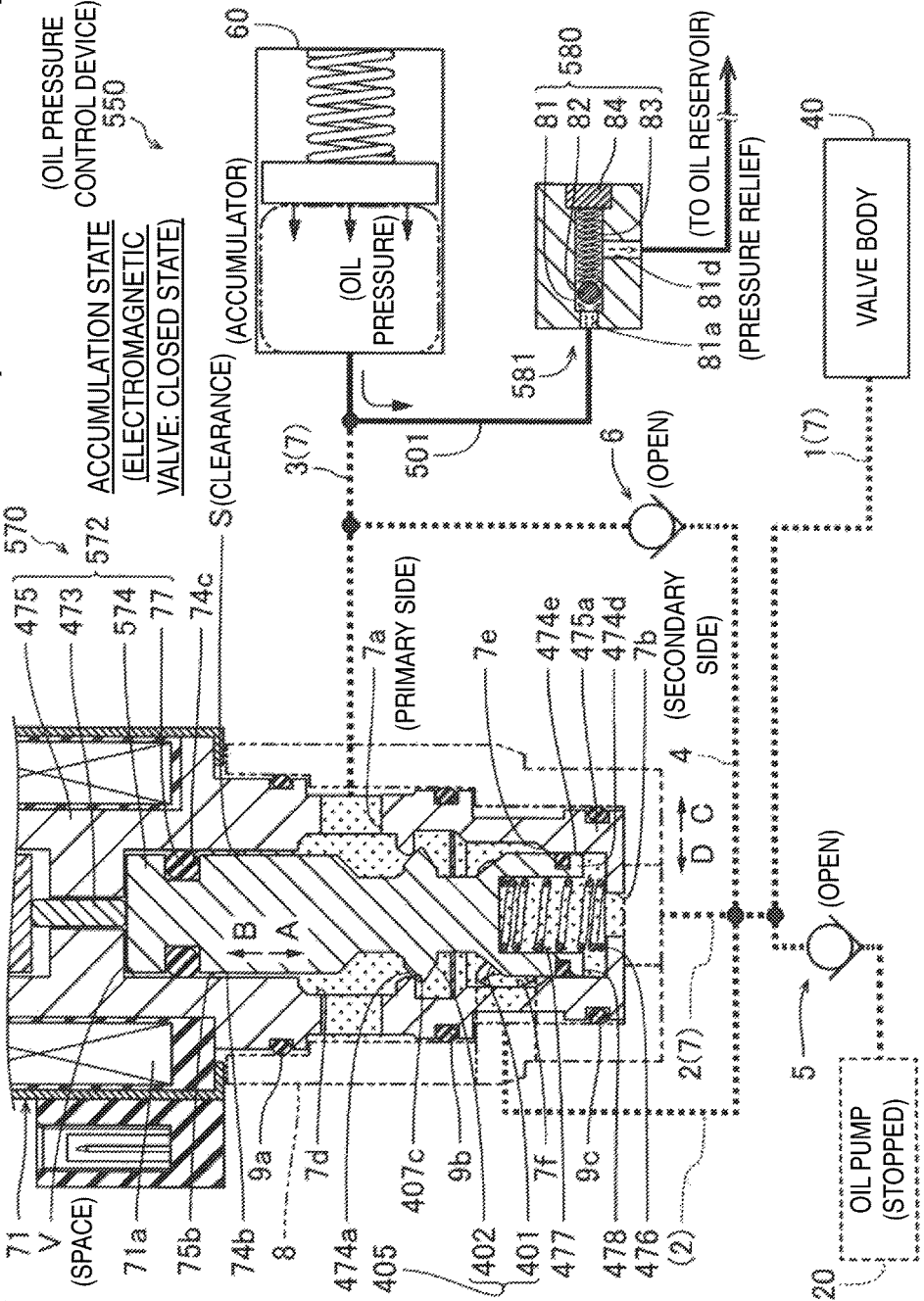
FIG. 14 illustrates a configuration of an oil pressure control device according to a fifth exemplary embodiment.

With reference to FIGS. 11 and 14, next, a description will be given of a fifth exemplary embodiment. The fifth exemplary embodiment concerns a configuration in which a pressure regulation mechanism 580 is provided separately from an electromagnetic valve 570. It should be noted that similar constituent elements to those described in the first exemplary embodiment are denoted with the same reference signs in the figures.

As illustrated in FIG. 14, an oil pressure control device 550 according to the fifth exemplary embodiment includes the electromagnetic valve 570. In the electromagnetic valve 570, a pressure regulation mechanism 80 (see FIG. 11) is not disposed in an oil path opening and closing valve element 574 to be held in a main body 572. On the other hand, in the oil pressure control device 550, the pressure regulation mechanism 580 is disposed on an oil path 501 that branches off from an oil path 3. The pressure regulation mechanism 580 includes a main body 581 that is similar in internal configuration to the pressure regulation mechanism 80 (see FIG. 11). It should be noted that the oil pressure control device 550 and the main body 572 are an example of a "transmission-use oil pressure control device" and an example of an "electromagnetic valve main body", respectively, in the appended claims. Moreover, the oil path 501 and a portion corresponding to the oil path 3 including an internal oil path 7*d* in the electromagnetic valve 570 are an example of a "first oil path" in the appended claims.

Thus, in the oil pressure control device 550, when an accumulator 60-side oil pressure in the electromagnetic valve 570 rises to a predetermined value P1 or more, the externally connected pressure regulation mechanism 580 operates to gradually distribute a hydraulic fluid to be applied to an inlet port 7*a*, toward an oil reservoir (not illustrated) via a pressure regulation passage 81. This configuration accordingly releases an excessive oil pressure (an internal pressure in an accumulator 60) to be applied from the accumulator 60 to the electromagnetic valve 570, in accumulating the oil pressure. The electromagnetic valve 570 including the oil path opening and closing valve element 574 (pressure receiving portion 405) except the pressure regulation mechanism 580 is similar in configuration to the electromagnetic valve 470 according to the fourth exemplary embodiment.

(Advantageous Effects of Fifth Exemplary Embodiment)

In the fifth exemplary embodiment, as described above, the pressure regulation mechanism 580 is disposed, separately from the electromagnetic valve 570, on the oil path 501 between the accumulator 60 and the electromagnetic valve 570. With this configuration, it is also possible to normally actuate an oil path opening and closing valve element 74 of the electromagnetic valve 570 while maintaining the sealability of an O-ring 77. This configuration also ensures smooth operation of the electromagnetic valve 570 and hydraulic assist for a valve body 40 in returning from an idling stop state.

[Modifications]

It is to be understood that the embodiments disclosed herein are merely illustrative and not restrictive in all respects. The scope of the present subject matter is defined by the appended claims rather than the foregoing embodiments. The present subject matter is therefore intended to embrace all changes (modifications) within the meanings and scopes equivalent to the claims.

For example, in the first to fifth exemplary embodiments, the present subject matter is applied to the oil pressure control device 50 (250, 350, 450, 550) of the automatic transmission 100 including the transmission mechanism 30 constituted of the planetary gear unit (speed change gears); however, the present subject matter is not limited thereto. That is, the present subject matter may be applied to an oil pressure control device that supplies an oil pressure to a continuously variable transmission (CVT) that can continuously change a speed without using speed change gears. The transmission may be any one of a transmission for a longitudinal engine and a transmission for a transverse engine.

Also in the first to fourth exemplary embodiments, the pressure regulation mechanism 80 is disposed in the oil path opening and closing valve element 74 (274, 374, 474) of the electromagnetic valve 70 (270, 370, 470); however, the present subject matter is not limited thereto. For example, an "oil pressure relief passage" and a "pressure regulating valve element" may be disposed in the valve element accommodating portion 75 of the electromagnetic valve 70. When the oil pressure is the predetermined value P1 or more in the state in which the oil path opening and closing valve element 74 is closed, the inlet port 7a and the outlet port 7b may communicate with each other so as to release the oil pressure.

Also in the first to fifth exemplary embodiments, the holding member 84 is simply fitted into the first passage 81c to hold the spring 83; however, the present subject matter is not limited thereto. For example, screw grooves are respectively formed in the outer peripheral face of the holding member 84 and the inner peripheral face of the first passage 81c, and the biasing force of the internal spring 83 may be adjusted in accordance with a degree of screwing (tightening) the holding member 84. Accordingly, even when the predetermined value P1 for pressure relief is required to be changed in accordance with, for example, a material for the O-ring 77 to be mounted, the spring 83 is not necessarily exchanged. It is thus possible to provide an accumulator-use electromagnetic valve capable of easily coping with a change of a relief pressure setting value.

Also in the second exemplary embodiment, the opening 81a in the pressure regulation passage 81 and the opening 91a in the oil path 91 are open at the same side of the outer peripheral face 74b of the oil path opening and closing valve element 274; however, the present subject matter is not limited thereto. The opening 91a may be open at the opposite side from the opening 81a with respect to the outer peripheral face 74b.

Also in the first to fifth exemplary embodiments, the pressure regulation mechanism 80 (580) is constituted of the spherical pressure regulating valve element 82; however, the present subject matter is not limited thereto. For example, the present subject matter may employ a conical needle or an umbrella-shaped poppet. Alternatively, the present subject matter may employ a "pressure regulating valve element" having, on its both ends, a pair of semispherical portions and formed into an oval shape (track shape) in its longitudinal section.

Also in the third exemplary embodiment, only the pressure regulation mechanism 80 is disposed in the oil path opening and closing valve element 374 provided with the pressure equalizing oil path 79; however, the present subject matter is not limited thereto. That is, the electromagnetic valve 370 may be configured in such a manner that the backflow prevention mechanism 90 described in the second exemplary embodiment is further added to the oil path opening and closing valve element 374.

Also in the first to fifth exemplary embodiments, the present subject matter is applied to the normally closed electromagnetic valve that is not energized when being fully closed; however, the present subject matter is not limited thereto. That is, the present subject matter may be applied to a normally open electromagnetic valve that is not energized when being fully opened. Accordingly, even when the valve element (movable core) is degaussed from the state in which the oil path is closed at the time of excitation (energization), and then is actuated in the direction of opening the oil path by the spring force, the sliding resistance of the seal member remains appropriate, so that the valve element can be actuated normally.

REFERENCE SIGNS LIST 3, 501: oil path (first oil path)
7: oil path (oil path between accumulator and transmission; second oil path)
20: oil pump
30: transmission mechanism
40: valve body
50, 250, 350, 450, 550: oil pressure control device (transmission-use oil pressure control device)
60: accumulator
70, 270, 370, 470, 570: electromagnetic valve
71: solenoid
72, 472, 572: main body (electromagnetic valve main body)
74, 274, 374, 474, 574: oil path opening and closing valve element
75, 475: valve element accommodating portion
77: O-ring (seal member)
79: pressure equalizing oil path
80, 580: pressure regulation mechanism
81: pressure regulation passage (oil pressure relief passage)
82: pressure regulating valve element
83: spring (biasing member)
90: backflow prevention mechanism
100: automatic transmission
401: first pressure receiving face 402: second pressure receiving face
405: pressure receiving portion

The invention claimed is:

1. An electromagnetic valve for use in a transmission-use oil pressure control device including an oil pump that supplies an oil pressure to a transmission to be operated by the oil pressure, and an accumulator that accumulates an oil pressure generated by the oil pump, the electromagnetic valve comprising:
an electromagnetic valve main body that is connected to the accumulator and includes an oil path opening and closing valve element opening and closing an oil path between the accumulator and the transmission;
a seal member that is disposed in the electromagnetic valve main body and seals against oil leakage from a sliding portion of the oil path opening and closing valve element in the opening and closing operation of the oil path opening and closing valve element; and
a pressure regulation mechanism that is disposed in the electromagnetic valve main body and regulates to release an internal pressure in the accumulator when an accumulator-side oil pressure in the electromagnetic valve main body rises to a predetermined pressure or more.

2. The electromagnetic valve according to claim 1, wherein
the pressure regulation mechanism is disposed in the oil path opening and closing valve element.

3. The electromagnetic valve according to claim 2, wherein
the pressure regulation mechanism includes:
an oil pressure relief passage that is provided in the oil path opening and closing valve element and establishes a connection between a primary side and a secondary side of the oil path opening and closing valve element; and
a pressure regulating valve element that is movably disposed in the oil pressure relief passage and opens and closes the oil pressure relief passage, and
when the accumulator-side oil pressure in the electromagnetic valve main body rises to the predetermined pressure or more, the pressure regulating valve element moves in an opening direction to release the internal pressure in the accumulator from the primary side to the secondary side of the oil path opening and closing valve element via the oil pressure relief passage.

4. The electromagnetic valve according to claim 3, wherein
the electromagnetic valve main body further includes a backflow prevention mechanism that is disposed in the electromagnetic valve main body and prevents backflow of oil from the accumulator into the oil pump accumulating oil pressure.

5. The electromagnetic valve according to claim 4, wherein
the backflow prevention mechanism is disposed together with the pressure regulation mechanism in the oil path opening and closing valve element.

6. The electromagnetic valve according to claim 3, wherein
the pressure regulation mechanism further includes a biasing member that biases the pressure regulating valve element in a closing direction, and
when the accumulator-side oil pressure in the electromagnetic valve main body rises to the predetermined pressure or more, the pressure regulating valve element moves in the opening direction against a biasing force of the biasing member to release the internal pressure in the accumulator from the primary side to the secondary side of the oil path opening and closing valve element via the oil pressure relief passage.

7. The electromagnetic valve according to claim 5, wherein
the oil path opening and closing valve element has:
a first pressure receiving face that receives an oil pump-side oil pressure when the oil path opening and closing valve element moves in one direction to open the oil path, and
a second pressure receiving face that receives the oil pump-side oil pressure when the oil path opening and closing valve element moves in the other direction to close the oil path, and
the first pressure receiving face is equal in pressure receiving area to the second pressure receiving face.

8. The electromagnetic valve according to claim 2, wherein
the electromagnetic valve main body further includes a backflow prevention mechanism that is disposed in the electromagnetic valve main body and prevents backflow of oil from the accumulator into the oil pump accumulating oil pressure.

9. The electromagnetic valve according to claim 8, wherein
the backflow prevention mechanism is disposed together with the pressure regulation mechanism in the oil path opening and closing valve element.

10. The electromagnetic valve according to claim 1, wherein
the electromagnetic valve main body further includes a backflow prevention mechanism that is disposed in the electromagnetic valve main body and prevents backflow of oil from the accumulator into the oil pump accumulating oil pressure.

11. The electromagnetic valve according to claim 10, wherein
the backflow prevention mechanism is disposed together with the pressure regulation mechanism in the oil path opening and closing valve element.

12. The electromagnetic valve according to claim 1, wherein
the oil path opening and closing valve element has:
a first pressure receiving face that receives an oil pump-side oil pressure when the oil path opening and closing valve element moves in one direction to open the oil path, and
a second pressure receiving face that receives the oil pump-side oil pressure when the oil path opening and closing valve element moves in the other direction to close the oil path, and
the first pressure receiving face is equal in pressure receiving area to the second pressure receiving face.

13. A transmission-use oil pressure control device comprising:
an oil pump that supplies an oil pressure to a transmission to be operated by the oil pressure;
an accumulator that accumulates an oil pressure generated by the oil pump;
an electromagnetic valve that includes
an oil path opening and closing valve element connected to the accumulator and opening and closing an oil path between the accumulator and the transmission, and
a seal member sealing against oil leakage from a sliding portion of the oil path opening and closing valve element in the opening and closing operation of the oil path opening and closing valve element; and a pressure regulation mechanism that regulates to release an internal pressure in the accumulator when the oil pressure in the accumulator rises to a predetermined pressure or more.

14. The transmission-use oil pressure control device according to claim 13, wherein the pressure regulation mechanism is disposed on a first oil path between the accumulator and the electromagnetic valve.

15. The transmission-use oil pressure control device according to claim 13, wherein the pressure regulation mechanism is disposed in the electromagnetic valve.

16. The transmission-use oil pressure control device according to claim 15, wherein the oil path opening and closing valve element opens and closes a second oil path between the accumulator and the transmission, and the pressure regulation mechanism is disposed in the oil path opening and closing valve element.

17. The transmission-use oil pressure control device according to claim 16, wherein the pressure regulation mechanism includes:

an oil pressure relief passage that is provided in the oil path opening and closing valve element and establishes a connection between a primary side and a secondary side of the oil path opening and closing valve element; and a pressure regulating valve element that is movably disposed in the oil pressure relief passage and opens and closes the oil pressure relief passage, and when an accumulator-side oil pressure in the electromagnetic valve rises to the predetermined pressure or more, the pressure regulating valve element moves in an opening direction to release the internal pressure in the accumulator from the primary side to the secondary side of the oil path opening and closing valve element via the oil pressure relief passage.

18. The transmission-use oil pressure control device according to claim 17, wherein the pressure regulation mechanism further includes a biasing member that biases the pressure regulating valve element in a closing direction, and when the accumulator-side oil pressure in the electromagnetic valve rises to the predetermined pressure or more, the pressure regulating valve element moves in the opening direction against a biasing force of the biasing member to release the internal pressure in the accumulator from the primary side to the secondary side of the oil path opening and closing valve element via the oil pressure relief passage.

\* \* \* \* \*